United States Patent
Wiegman et al.

(10) Patent No.: US 12,288,471 B2
(45) Date of Patent: *Apr. 29, 2025

(54) APPARATUS FOR DETERMINING A MOST LIMITING PARAMETER OF AN ELECTRIC AIRCRAFT

(71) Applicant: BETA AIR, LLC, South Burlington, VT (US)

(72) Inventors: Herman Wiegman, South Burlington, VT (US); Thomas Henck, South Burlington, VT (US); Sarah Overfield, South Burlington, VT (US); Richard Donnelly, South Burlington, VT (US)

(73) Assignee: BETA AIR LLC, South Burlington, VT (US)

( * ) Notice: Subject to any disclaimer, the term of this patent is extended or adjusted under 35 U.S.C. 154(b) by 295 days.

This patent is subject to a terminal disclaimer.

(21) Appl. No.: 17/824,546

(22) Filed: May 25, 2022

(65) Prior Publication Data
US 2023/0386345 A1    Nov. 30, 2023

Related U.S. Application Data

(63) Continuation-in-part of application No. 17/824,472, filed on May 25, 2022, now Pat. No. 11,827,375.

(51) Int. Cl.
*G08G 5/00* (2006.01)
*B64U 50/19* (2023.01)
*B64U 70/80* (2023.01)

(52) U.S. Cl.
CPC ............. *G08G 5/003* (2013.01); *B64U 50/19* (2023.01); *B64U 70/80* (2023.01)

(58) Field of Classification Search
CPC ................... B64D 45/00; B64D 43/00; B64D 2045/0085; G08G 5/003; G08G 5/0021;
(Continued)

(56) References Cited

U.S. PATENT DOCUMENTS 9,135,828 B2   9/2015  Leones et al.
10,281,913 B2  5/2019  Dong et al.
(Continued)

FOREIGN PATENT DOCUMENTS

WO       2021096565        5/2021

OTHER PUBLICATIONS

Xiaomin Yao 1, Wenshual Liu1, Wenting Han 1,2,*,Guang LI 1 and Qian Ma,Development of Response Surface Model of Endurance Time and Structural Parameter Optimization for a Tallsitter UAV, Mar. 22, 2022.
(Continued)

*Primary Examiner* — Donald J Wallace
*Assistant Examiner* — Jalal C Coduroglu
(74) *Attorney, Agent, or Firm* — Lee & Hayes, P.C.

(57) ABSTRACT

In an aspect an apparatus for determining a most limiting parameter of an electric aircraft is presented. An apparatus includes at least a processor and a memory communicatively connected to the at least a processor. A memory contains instructions configuring at least a processor to receive aircraft data from a sensing device. A sensing device is configured to measure a parameter of an electric aircraft and generate aircraft data. At least a processor is configured to determine a most limiting parameter of an electric aircraft as a function of aircraft data. At least a processor is configured to communicate a most limiting parameter to a pilot indicator in communication with the at least a processor and memory communicatively connected to the at least a processor. A pilot indicator is configured to display a most limiting parameter to a user.

20 Claims, 11 Drawing Sheets

(58) Field of Classification Search
CPC .... G08G 5/0052; B64C 39/024; B64U 50/19; B64U 70/80
See application file for complete search history.

(56) References Cited

U.S. PATENT DOCUMENTS

| | | | |
|---|---|---|---|
| 11,482,118 B1* | 10/2022 | Nealy | G08G 5/003 |
| 11,572,183 B1* | 2/2023 | Overfield | G06Q 10/04 |
| 2004/0010354 A1* | 1/2004 | Nicholas | B64C 13/503 |
| | | | 701/4 |
| 2014/0008498 A1* | 1/2014 | Reiter | B64C 39/024 |
| | | | 244/99.11 |
| 2016/0093222 A1* | 3/2016 | Hale | G08G 5/0021 |
| | | | 701/120 |
| 2016/0179096 A1 | 6/2016 | Bradlow et al. | |
| 2016/0236790 A1* | 8/2016 | Knapp | B64C 11/44 |
| 2016/0368600 A1* | 12/2016 | Frolov | B64U 10/25 |
| 2017/0203839 A1* | 7/2017 | Giannini | B64U 10/20 |
| 2017/0291722 A1* | 10/2017 | Owens | G05B 19/0428 |
| 2019/0066409 A1 | 2/2019 | Moreira Da Mota | |
| 2019/0185157 A1* | 6/2019 | Blake | B60L 53/51 |
| 2019/0248244 A1* | 8/2019 | Gayney | F16H 9/26 |
| 2019/0278897 A1* | 9/2019 | Zhang | G07C 5/008 |
| 2019/0311631 A1 | 10/2019 | Holmes | |
| 2020/0290742 A1* | 9/2020 | Kumar | B64D 27/24 |
| 2020/0391876 A1* | 12/2020 | Morrison | H02K 11/33 |
| 2021/0263537 A1* | 8/2021 | Belt | G08G 5/0034 |
| 2021/0339851 A1 | 11/2021 | Fell, Jr. et al. | |
| 2021/0383706 A1 | 12/2021 | Gibbons, II et al. | |
| 2021/0407303 A1* | 12/2021 | Yogesha | G05D 1/81 |
| 2022/0106060 A1* | 4/2022 | Morrison | B64C 27/20 |
| 2022/0173601 A1* | 6/2022 | Lohe | H01M 50/249 |
| 2023/0084918 A1* | 3/2023 | Wiegman | B64D 45/00 |
| | | | 701/3 |

OTHER PUBLICATIONS

Seok-ho Jang, Youyoung Yang and Henzeh Leeghim, Angular Rate Constrained Sliding Mode Control of UAVs for Path Following, Nov. 12, 2021.

Robin Lantzsch1, Steffen Greiser1, Jens Wolfram1, Johannes Wartmann1 and Mario Müllhäusen, Allflight: Helicopter Pilot Assistance in All Phases of Flight, Dec. 31, 2012.

Ming Zhang 1, Chen Su 1, Yuan Liu 2, Mingyuan Hu 2 and Yuesheng Zhu, Unmanned Aerial Vehicle Route Planning in the Presence of a Threat Environment Based on a Virtual Globe Platform, Oct. 10, 2016.

Nilesh A Sahani, Envelope Protection Systems for Piloted and Unmanned Rotorcraft, Dec. 1, 2005.

Alfonso Alcántara, Jesús Capitán, Rita Cunha and Aníbal Ollero, Optimal trajectory planning for cinematography with multiple Unmanned Aerial Vehicles, Mar. 29, 2021.

Mikhail Gorobetz; Andrejs Potapovs; Aleksandr Korneyev, Analysis and modelling of UAV electrical traction drive based on empirical data for energy efficiency tasks, Jul. 10, 2019.

Antonio Montero Barriga, Hybrid engines on passenger aircraft, Jul. 9, 2021.

* cited by examiner

APPARATUS FOR DETERMINING A MOST LIMITING PARAMETER OF AN ELECTRIC AIRCRAFT

CROSS-REFERENCE TO RELATED APPLICATIONS

This application is a continuation-in-part of Non-provisional application Ser. No. 17/824,472 filed on May 25, 2022 and entitled "APPARATUS FOR DETERMINING A MOST LIMITING PARAMETER OF AN ELECTRIC AIRCRAFT," the entirety of which is incorporated herein by reference.

FIELD OF THE INVENTION

The present invention generally relates to the field of electric aircraft. In particular, the present invention is directed to an apparatus for determining a most limiting parameter of an electric aircraft.

BACKGROUND

Electric aircraft have many parts and systems that use up fuel and energy stores during operation. However, modern electric aircraft do not have an apparatus that determines a most limiting parameter of all parts and systems used by electric aircraft during flight.

SUMMARY OF THE DISCLOSURE

In an aspect an apparatus for determining a most limiting parameter of a hybrid aircraft is presented. An apparatus includes at least a processor and a memory communicatively connected to the at least a processor. A memory contains instructions configuring at least a processor to receive aircraft data from a sensing device. A sensing device is configured to measure a parameter of a hybrid aircraft and generate aircraft data. At least a processor is configured to determine a most limiting parameter of a hybrid aircraft as a function of aircraft data. A most limiting parameter is related to a fuel level of the hybrid aircraft. At least a processor is configured to communicate a most limiting parameter to a pilot indicator in communication with the at least a processor and memory communicatively connected to the at least a processor. A pilot indicator is configured to display a most limiting parameter to a user.

In another aspect a method of determining a most limiting parameter of a hybrid aircraft is presented. A method includes measuring at a sensing device of a hybrid aircraft a parameter of the hybrid aircraft. A method includes generating at a sensing device aircraft data as a function of a parameter of a hybrid aircraft. A method includes communicating aircraft data from a sensing device to at least a processor and a memory communicatively connected to the at least a processor. A method includes determining a most limiting parameter of a hybrid aircraft as a function of aircraft data by at least a processor and a memory communicatively connected to the at least a processor. A method includes communicating a most limiting parameter of a hybrid aircraft from at least a processor and a memory communicatively connected to the at least a processor to a pilot indicator. A method includes displaying a most limiting parameter to a user.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to an apparatus for determining a most limiting parameter of an electric aircraft. In an embodiment, an apparatus may include at least a processor and a memory communicatively connected to the at least a processor. An apparatus may be configured to receive aircraft data from a sensing device of an electric aircraft and determine compare the aircraft data to flight confidence parameters to determine a most limiting parameter. A most limiting parameter may include a flight parameter of an electric aircraft that may reduce a flight range of the electric aircraft.

Aspects of the present disclosure can be used to predict most limiting parameters of flights of electric aircraft using a most limiting parameter machine learning model. Aspects of the present disclosure can also be used to alert a user, such as a pilot, to a flight parameter exceeding an operational threshold. This is so, at least in part, a pilot may be alerted of a flight parameter that may limit a flight range.

Aspects of the present disclosure allow for informed flight planning and analytics. A most limiting parameter may assist in determining flight paths, generating power saving flight plans, and the like. Exemplary embodiments illustrating aspects of the present disclosure are described below in the context of several specific examples.

Figure 1:
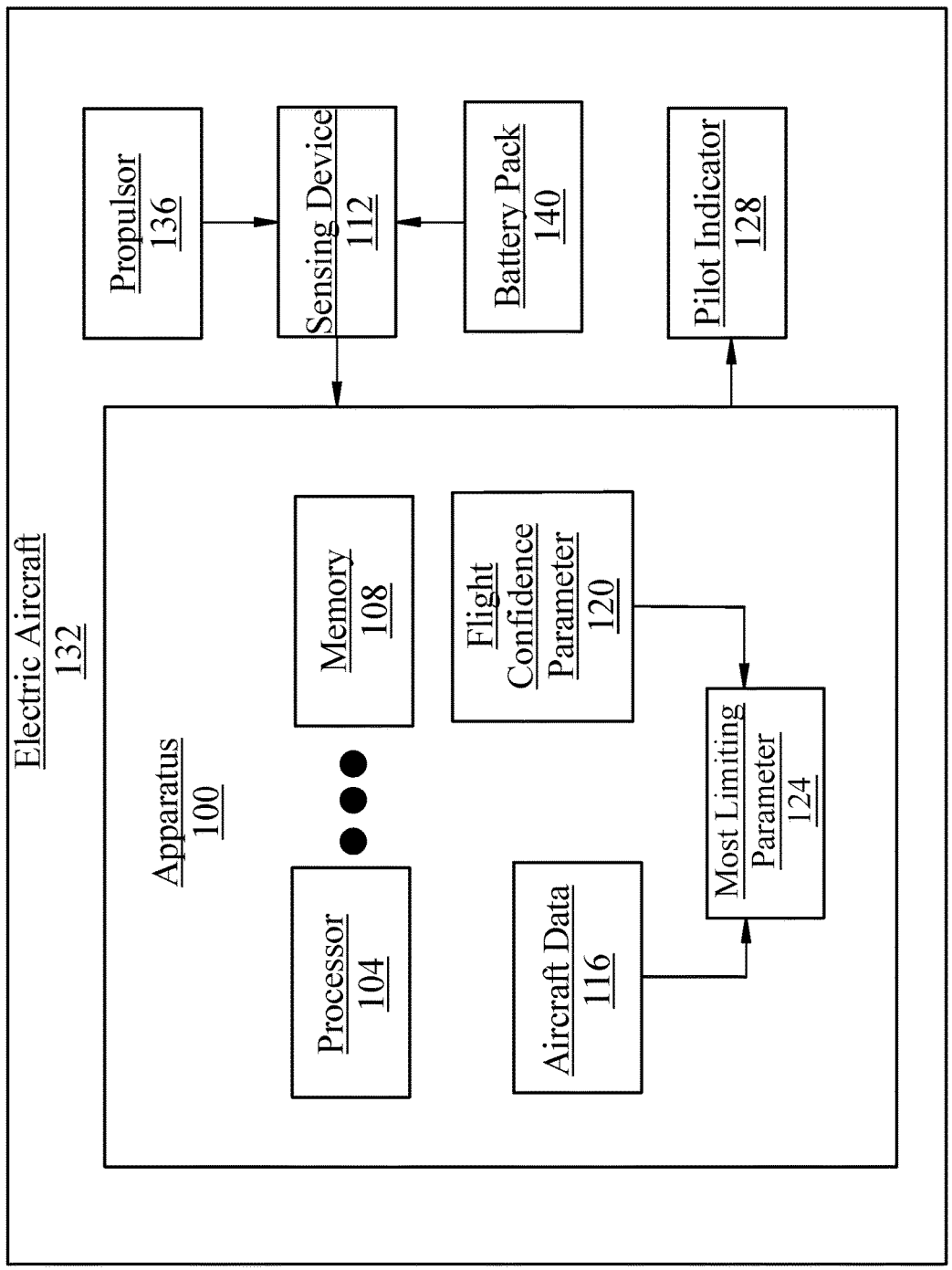
FIG. 1 is an exemplary embodiment of an apparatus for determining a most limiting parameter of an electric aircraft.

Referring now to FIG. 1, an exemplary embodiment of an apparatus 100 for determining a most limiting parameter is illustrated. Apparatus 100 may include a computing device. A computing device may include any computing device as described in this disclosure, including without limitation a microcontroller, microprocessor, digital signal processor (DSP) and/or system on a chip (SoC) as described in this disclosure. A computing device may include, be included in, and/or communicate with a mobile device such as a mobile telephone or smartphone. Apparatus 100 may include a single computing device operating independently, or may include two or more computing device operating in concert, in parallel, sequentially or the like; two or more computing devices may be included together in a single computing device or in two or more computing devices. Apparatus 100 may interface or communicate with one or more additional devices as described below in further detail via a network interface device. Network interface device may be utilized for connecting apparatus 100 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Apparatus 100 may include but is not limited to, for example, a computing device or cluster of computing devices in a first location and a second computing device or cluster of computing devices in a second location. Apparatus 100 may include one or more computing devices dedicated to data storage, security, distribution of traffic for load balancing, and the like. Apparatus 100 may distribute one or more computing tasks as described below across a plurality of computing devices of apparatus 100, which may operate in parallel, in series, redundantly, or in any other manner used for distribution of tasks or memory between computing devices. Apparatus 100 may be implemented using a "shared nothing" architecture in which data is cached at the worker, in an embodiment, this may enable scalability of apparatus 100.

With continued reference to FIG. 1, apparatus 100 may be designed and/or configured to perform any method, method step, or sequence of method steps in any embodiment described in this disclosure, in any order and with any degree of repetition. For instance, apparatus 100 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Apparatus 100 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, apparatus 100 may include at least a processor 104 and a memory 108 communicatively connected to the at least a processor 104. "Communicatively connected" as used in this disclosure is an attribute of a connection, attachment or linkage between two or more relata which allows for reception and/or transmittance of information therebetween. In some embodiments, apparatus 100 may include a flight controller as described below with reference to FIG. 3. In some embodiments, memory 108 may include instructions that may configure the at least a processor 104 to perform various tasks. Instructions may be received from, but not limited to, an external computing device, user input, and the like. Apparatus 100 may be communicatively connected with sensing device 112. A "sensing device" as used in this disclosure is a device that is configured to detect a phenomenon and transmit information related to the detection of the phenomenon. Sensing device 112 may be configured to transduce a detected phenomenon, such as without limitation, voltage, current, speed, direction, force, torque, temperature, pressure, and the like, into a sensed signal. In one or more embodiments, sensing device 112 may include a plurality of sensors. Sensing device 112 may include, but is not limited to, an electrical sensor, an imaging sensor, such as a camera or infrared sensor, a motion sensor, an inertia measurement unit (IMU), a radio frequency sensor, a light detection and ranging (LIDAR) sensor, an orientation sensor, a temperature sensor, a humidity sensor, or the like, as discussed further below in this disclosure. In one or more embodiments, and without limitation, sensing device 112 may include one or more temperature sensors, voltmeters, current sensors, hydrometers, infrared sensors, photoelectric sensors, ionization smoke sensors, motion sensors, pressure sensors, radiation sensors, level sensors, imaging devices, moisture sensors, gas and chemical sensors, flame sensors, electrical sensors, imaging sensors, force sensors, Hall sensors, and the like. Sensing device 112 may include a contact or a non-contact sensor. Sensing device 112 may include one or more sensors which may be the same, similar or different. Sensing device 112 may include a plurality of sensors which may be the same, similar or different. Sensing device 112 may include one or more sensor suites with sensors in each sensor suite being the same, similar or different. A sensor suite may be as described below with reference to FIG. 4. Still referring to FIG. 1, sensing device 112 may be configured to generate aircraft data 116 as a function of one or more detected phenomenon. "Aircraft data" as used in this disclosure is information pertaining to one or more parts, components, or systems of an aircraft. Aircraft data 116 may include, but is not limited to, battery temperature, battery health, battery charge, generator temperature, generator health, fuel level, aircraft altitude, aircraft velocity, aircraft acceleration, rotor torque, aircraft power systems, and the like. Sensing device 112 may be in communicative connection with a propulsor 136. For the purposes of this disclosure, a "propulsor" is a component or device used to propel a craft by exerting force on a fluid medium, which may include a gaseous medium such as air or a liquid medium such as water. Propulsor 136 may include any device or component that consumes electrical power on demand to propel an electric aircraft in a direction while on ground or in-flight. For example, and without limitation, propulsor may include a rotor, propeller, paddle wheel, and the like thereof. In an embodiment, propulsor may include a plurality of blades that radially extend from a hub of the propulsor so that the blades may convert a rotary motion from a motor into a swirling slipstream. In an embodiment, blade may convert rotary motion to push an aircraft forward or backward. For instance, and without limitation, propulsor 136 may include an assembly including a rotating power-driven hub, to which several radially-extending airfoil-section blades are fixedly attached thereto, where the whole assembly rotates about a central longitudinal axis A. The blade pitch of a propeller may, for example, be fixed, manually variable to a few set positions, automatically variable (e.g., a "constant-speed" type), or any combination thereof. In an exemplary embodiment, propellers for an aircraft may be designed to be fixed to their hub at an angle similar to the thread on a screw makes an angle to the shaft; this angle may be referred to as a pitch or pitch angle which will determine the speed of the forward movement as the blade rotates. In one or more exemplary embodiments, propulsor 136 may include a vertical propulsor or a forward propulsor. A forward propulsor may include a propulsor configured to propel aircraft 104 in a forward direction. A vertical propulsor may include a propulsor configured to propel aircraft 104 in an upward direction. One of ordinary skill in the art would understand upward to comprise the imaginary axis protruding from the earth at a normal angle, configured to be normal to any tangent plane to a point on a sphere (i.e. skyward). In an embodiment, vertical propulsor can be a propulsor that generates a substantially downward thrust, tending to propel an aircraft in an opposite, vertical direction and provides thrust for maneuvers. Such maneuvers can include, without limitation, vertical take-off, vertical landing, hovering, and/or rotor-based flight such as "quadcopter" or similar styles of flight.

In one or more embodiments, propulsor 136 can include a thrust element which may be integrated into the propulsor. The thrust element may include, without limitation, a device using moving or rotating foils, such as one or more rotors, an airscrew, or propeller, a set of airscrews or propellers such as contra-rotating propellers, a moving or flapping wing, or the like. Further, a thrust element, for example, can include without limitation a marine propeller or screw, an impeller, a turbine, a pump-jet, a paddle or paddle-based device, or the like. In one or more embodiments, propulsor 136 may include a pusher component. As used in this disclosure a "pusher component" is a component that pushes and/or thrusts an aircraft through a medium. As a non-limiting example, pusher component may include a pusher propeller, a paddle wheel, a pusher motor, a pusher propulsor, and the like. Pusher component may be configured to produce a forward thrust. As used in this disclosure a "forward thrust" is a thrust that forces aircraft through a medium in a horizontal direction, wherein a horizontal direction is a direction parallel to the longitudinal axis. For example, forward thrust may include a force of 1145 N to force electric aircraft 104 in a horizontal direction along a longitudinal axis of electric aircraft 104. As a further non-limiting example, pusher component may twist and/or rotate to pull air behind it and, at the same time, push electric aircraft 104 forward with an equal amount of force. In an embodiment, and without limitation, the more air forced behind aircraft, the greater the thrust force with which electric aircraft 104 is pushed horizontally will be. In another embodiment, and without limitation, forward thrust may force electric aircraft 104 through the medium of relative air. Additionally or alternatively, plurality of propulsor may include one or more puller components. As used in this disclosure a "puller component" is a component that pulls and/or tows an aircraft through a medium. As a non-limiting example, puller component may include a flight component such as a puller propeller, a puller motor, a tractor propeller, a puller propulsor, and the like. Additionally, or alternatively, puller component may include a plurality of puller flight components. Propulsor 136 may include, but is not limited to, a motor, rotor, stator, blades, inverters, and the like. Propulsor 136 may be as described below with reference to FIG. 2. Sensing device 132 may detect and/or measure values of propulsor 136, such as, but not limited to, rotational speeds, torques, voltages, currents, temperatures, and the like. Sensing device 112 may be in communicative connection with battery pack 140. Battery pack 140 may include one or more battery cells, such as, but not limited to, lithium-ion cells, pouch cells, and the like. Battery pack 140 may be configured to power electric aircraft 132. Battery pack 140 may be as described below with reference to FIG. 4. Sensing device 112 may detect and/or measure values of battery pack 140, such as, but not limited to, state of charge, capacity, temperature, voltages, currents, resistances, and the like. In some embodiments, apparatus 100 may be configured to receive aircraft data 116 from sensing device 112. Aircraft data 116 may be received wirelessly and/or wired from sensing device 112 at apparatus 100. Apparatus 100 may be configured to compare aircraft data 116 to flight confidence parameter 120. A "flight confidence parameter" as used in this disclosure is a parameter to which aircraft data can be compared to determine a degree of readiness for a given flight and/or for flight in general. Flight confidence parameter 120 may include a minimum threshold. A "minimum threshold" as used in this disclosure is a metric value limit. As a non-limiting example, a minimum threshold may include a state of charge of battery pack 140 and/or an amount of fuel on a hybrid aircraft. In some embodiments, flight confidence parameter 120 may include a maximum value of a flight parameter. For instance, and without limitation, a maximum value may include battery temperatures, torque output, altitudes, hover times, cruising times, propulsor temperature, and the like. Flight confidence parameter 120 may include an optimal flight parameter. An "optimal flight parameter" as used in this disclosure is an ideal performance metric of one or more parts or systems of an aircraft. Flight confidence parameter 120 may include, but is not limited to, torques, speeds, altitudes, power outputs, and the like. As a non-limiting example, flight confidence parameter 120 may include a torque of a front rotor of an electric aircraft of 300 N*m during a cruising phase of the electric aircraft. Flight confidence parameter 120 may be specific to given flight paths, flight missions, aircraft type, and the like. For instance and without limitation, a flight mission may include a short range flight of about 50 miles. Flight confidence parameter 120 may have a higher minimum threshold of battery charge of battery pack 136 of about 60%. Flight confidence parameter 120 may be received from an external computing device and/or from user input.

Still referring to FIG. 1, in some embodiments, flight confidence parameter 120 may include one or more parameters as described in U.S. patent application Ser. No. 17/349,182, filed Jun. 16, 2021, and titled "SYSTEMS AND METHODS FOR IN-FLIGHT OPERATIONAL ASSESSMENT", which is incorporated by reference herein in its entirety.

Figure 7:
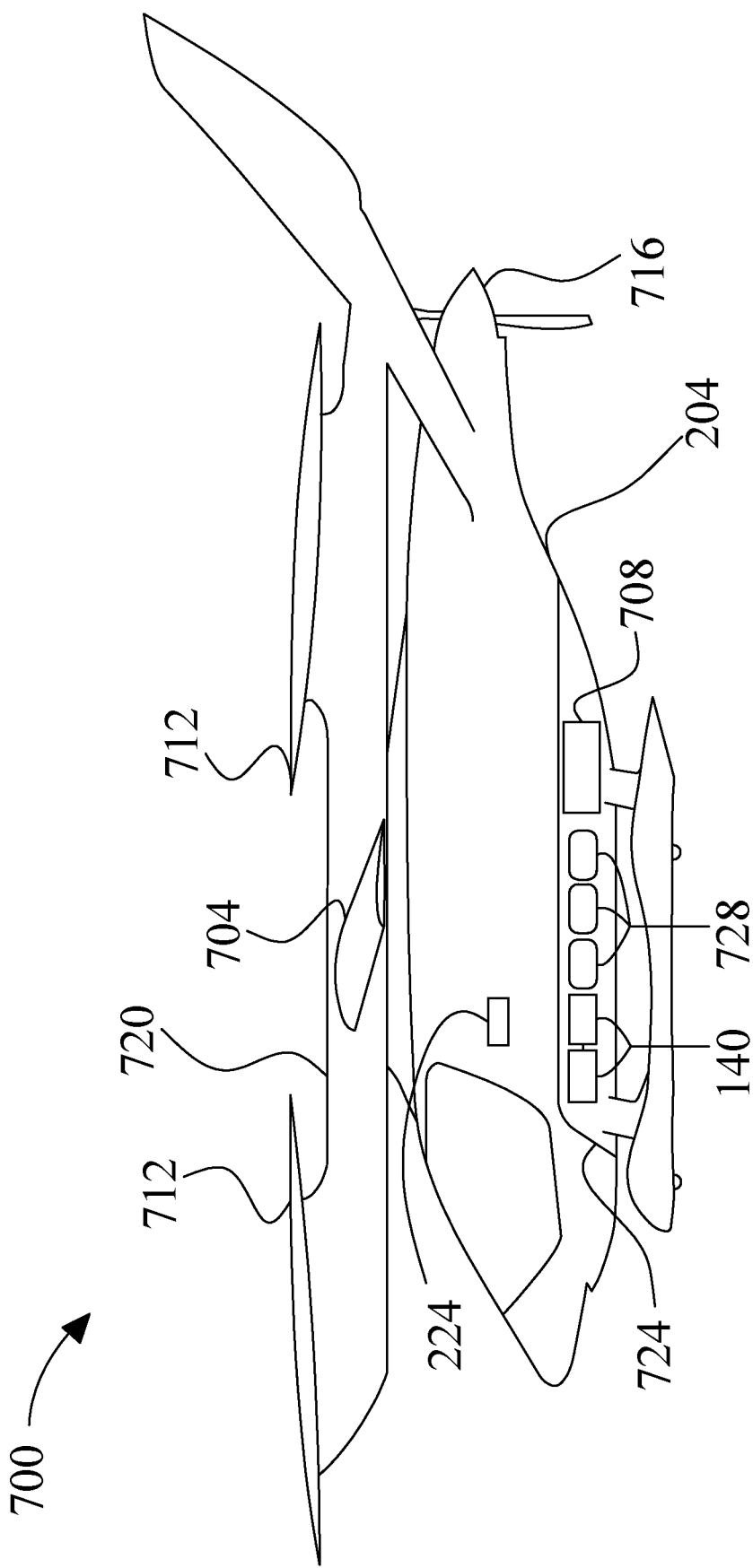
FIG. 7 is an illustration of an exemplary embodiment of a hybrid electric aircraft.

In some embodiments, electric aircraft 132 may include a hybrid aircraft, as illustrated in FIG. 7. Electric aircraft 132 may include a generator. A "generator," for the purposes of this disclosure, is a machine configured to generate electrical power from motive power. As a non-limiting example, in some embodiments, generator may include a turbine generator. As a non-limiting example, in some embodiments, generator may include a reciprocating engine. As a non-limiting example, in some embodiments, generator may include a fuel cell engine. As a non-limiting example, in some embodiments, generator may include a fuel reformer. Generator may be electrically connected to motors in electric aircraft 132. Generator may be configured to provide enough power to sustain electric aircraft 132 in flight. Electric aircraft 132 may include at least a fuel tank configured to hold fuel and feed the fuel to generator. As described in reference to FIG. 7, electric aircraft 132 may include a flight controller communicatively connected to generator. In some embodiments, flight controller may be communicatively connected to fuel cell. For example, sensing device 112 may include at least a sensor configured to determine an amount of fuel in fuel tank such as a fuel level and/or a current temperature of generator, which sensing device 112 may transmit to flight controller. Aircraft data 116 may include amount of fuel on electric aircraft 132 and/or generator temperature, which apparatus 100 may be configured to receive as discussed above.

Still referring to FIG. 1, in some embodiments, apparatus 100 may determine flight confidence parameter 120 as a function of aircraft data from a hybrid vehicle. Electric aircraft 132 may be consistent with features of a hybrid vehicle as described in U.S. patent application Ser. No. 17/734,015, filed Apr. 30, 2022, and titled "SYSTEM FOR AN INTEGRAL HYBRID ELECTRIC AIRCRAFT", U.S. patent application Ser. No. 17/734,014, filed Apr. 30, 2022, and titled "HYBRID PROPULSION SYSTEMS FOR AN ELECTRIC AIRCRAFT", and U.S. patent application Ser. No. 17/733,487, filed Apr. 29, 2022, and titled "HYBRID ELECTRIC VERTICAL TAKEOFF AND LANDING AIRCRAFT", each of which is incorporated by reference herein in their entirety. Still referring to FIG. 1, apparatus 100 may compare aircraft data 116 to flight confidence parameter 120 using an optimization criterion. An "optimization criterion" as used in this disclosure is a value that is sought to be maximized or minimized in a system. Apparatus 100 may use an objective function to compare aircraft data 116 to flight confidence parameter 120. An "objective function" as used in this disclosure is a process of minimizing or maximizing one or more values based on a set of constraints. Apparatus 100 may generate an objective function to optimize a flight plan of an electric aircraft. In some embodiments, an objective function of apparatus 100 may include an optimization criterion. An optimization criterion may include any description of a desired value or range of values for one or more attributes of a flight; desired value or range of values may include a maximal or minimal value, a range between maximal or minimal values, or an instruction to maximize or minimize an attribute. As a non-limiting example, an optimization criterion may specify that a flight speed of an electric aircraft should be at least 200 MPH; an optimization criterion may cap a flight speed of an electric aircraft, for instance specifying that an electric aircraft must not have a speed greater than a specified value. An optimization criterion may alternatively request that a flight parameter be greater than a certain value. An optimization criterion may specify one or more tolerances for fuel usage of a flight. An optimization criterion may specify one or more desired flight parameters of an electric aircraft, such as, but not limited to, torque speed, battery temperatures, battery health, altitudes, and the like. In an embodiment, an optimization criterion may assign weights to different attributes or values associated with attributes; weights, as used herein, may be multipliers or other scalar numbers reflecting a relative importance of a particular attribute or value. One or more weights may be expressions of value to a user of a particular outcome, attribute value, or other facet of a flight parameter; value may be expressed, as a non-limiting example, in remunerative form, such as a fuel cost, a quickest flight time, and the like. As a non-limiting example, minimization of flight time may be multiplied by a first weight, while tolerance above a certain value may be multiplied by a second weight. Optimization criteria may be combined in weighted or unweighted combinations into a function reflecting an overall outcome desired by a user; function may be a fuel function to be minimized and/or maximized. Function may be defined by reference to flight parameter constraints and/or weighted aggregation thereof as provided by apparatus 100; for instance, a fuel function combining optimization criteria may seek to minimize or maximize a function of battery temperature.

Still referring to FIG. 1, apparatus 100 may use an objective function to compare aircraft data 116 with flight confidence parameter 120. Generation of an objective function may include generation of a function to score and weight factors to achieve a process score for each feasible pairing. In some embodiments, pairings may be scored in a matrix for optimization, where columns represent aircraft data and rows represent flight confidence parameters potentially paired therewith; each cell of such a matrix may represent a score of a pairing of the corresponding aircraft data to the corresponding flight confidence parameter. In some embodiments, assigning a predicted process that optimizes the objective function includes performing a greedy algorithm process. A "greedy algorithm" is defined as an algorithm that selects locally optimal choices, which may or may not generate a globally optimal solution. For instance, apparatus 100 may select pairings so that scores associated therewith are the best score for each order and/or for each flight parameter. In such an example, optimization may determine the combination of flight parameters such that each object pairing includes the highest score possible.

Still referring to FIG. 1, an objective function may be formulated as a linear objective function. Apparatus 100 may solve an objective function using a linear program such as without limitation a mixed-integer program. A "linear program," as used in this disclosure, is a program that optimizes a linear objective function, given at least a constraint. For instance, and without limitation, objective function may seek to maximize a total score $\Sigma_{r \in R} \Sigma_{s \in S} c_{rs} x_{rs}$, where R is a set of all aircraft data r, S is a set of all flight confidence parameters s, $c_{rs}$ is a score of a pairing of a given aircraft datum with a given match, and $x_{rs}$ is 1 if an aircraft datum r is paired with a flight confidence parameter s, and 0 otherwise. Continuing the example, constraints may specify that each aircraft datum is assigned to only one flight confidence parameter, and each flight confidence parameter is assigned only one aircraft datum. Flight confidence parameters may include flight confidence parameters as described above. Sets of flight confidence parameters may be optimized for a maximum score combination of all generated flight confidence parameters. In various embodiments, apparatus 100 may determine a combination of flight confidence parameters that maximizes a total score subject to a constraint that all aircraft data are paired to exactly one flight confidence parameter. Not all flight confidence parameters may receive an aircraft datum pairing since each flight confidence parameter may only produce one aircraft datum.

In some embodiments, an objective function may be formulated as a mixed integer optimization function. A "mixed integer optimization" as used in this disclosure is a program in which some or all of the variables are restricted to be integers. A mathematical solver may be implemented to solve for the set of feasible pairings that maximizes the sum of scores across all pairings; mathematical solver may be implemented on processor 104 of apparatus 100 and/or another device of apparatus 100, and/or may be implemented on third-party solver.

With continued reference to FIG. 1, optimizing an objective function may include minimizing a loss function, where a "loss function" is an expression an output of which an optimization algorithm minimizes to generate an optimal result. As a non-limiting example, apparatus 100 may assign variables relating to a set of parameters, which may correspond to score flight parameters as described above, calculate an output of mathematical expression using the variables, and select a pairing that produces an output having the lowest size, according to a given definition of "size," of the set of outputs representing each of plurality of candidate ingredient combinations; size may, for instance, included absolute value, numerical size, or the like. Selection of different loss functions may result in identification of different potential pairings as generating minimal outputs. Objectives represented in an objective function and/or loss function may include minimization of fuel use. Objectives may include minimization of battery temperatures and/or generator temperatures. Objectives may include minimization of flight times. Objectives may include minimization of differences between aircraft data 116 and flight confidence parameter 120.

Still referring to FIG. 1, apparatus 100 may determine most limiting parameter 124. A "most limiting parameter" as used in this disclosure is an element of data associated with a part or system of an electric aircraft that has a most significant effect on a flight range of the electric aircraft. Apparatus 100 may generate a list of potential most limiting parameters. A list of potential most limiting parameters may include flight parameters related to heating systems. Heating systems may include AC systems that increase or decrease a temperature of parts of electric aircraft 132 such as a cockpit, passenger area, cargo area, and the like. A list of potential most limiting parameters may include flight parameters such as rotor torque. One or more rotors of electric aircraft 132 may rotate, producing a torque to assist in a maneuvering of electric aircraft 132. One or more rotors of electric aircraft 132 may require energy, such as electricity, to operate. A high torque of one or more rotors of electric aircraft 132 may drain a fuel source of electric aircraft 132, such as a fuel level and/or state of charge of battery pack and/or battery cells. A list of potential most limiting parameters may include aircraft speed. A speed of electric aircraft 132 may determine an amount of energy drained from a battery pack and/or battery cells of electric aircraft 132. A faster speed of electric aircraft 132 may drain a battery pack and/or battery cells of electric aircraft 132 more rapidly than, for example, a cruising speed. A list of potential most limiting parameters may include parameters related to one or more flight modes. A "flight mode" as used in this disclosure is a type of flight an electric aircraft engages in. Flight modes may include, but are not limited to, takeoff, hovering, climbing, cruising, descent, approach, hovering, landing, and any transition between thereof. As a non-limiting example, a flight mode of takeoff may drain a battery pack and/or battery cells of an electric aircraft faster than a cruising flight mode. Likewise, a hovering flight mode may require more energy than a descent flight mode, which may be attributed to a reduced rotor speed. In some embodiments, most limiting parameter 124 may be related to at least a battery of electric aircraft 132, such as battery pack 140. Most limiting parameter 124 may include parameters related to battery health. Battery health may include, but is not limited to, reduced capacity, full capacity, overheating, overcooling, and the like. As a non-limiting example, a colder battery may see reduced performance due to slower electrochemical reactions within the battery. Likewise, an overheated battery may see reduced performance due to excessive electrochemical reactions. Most limiting parameter 124 may include a state of charge of a battery. A state of charge may include a percent charge of a battery and/or battery pack. A percent charge may include, but is not limited to, 20%, 40%, 60%, 80%, and the like. A reduced state of charge may reduce a flight range of electric aircraft 132. In some embodiments, a list of potential most limiting parameters may include parameters related to inverter health. An "inverter" as used in this disclosure is an electric component configured to transform direct current (DC) to alternating current (AC). An overheated or overcooled inverter may see reduced performance. A list of potential most limiting parameters may include inverter, rotor, and/or motor temperature. Like inverters and batteries, rotors and motors may be prone to reduced performance due to overheating or overcooling. Apparatus 100 may determine most limiting parameter 124 from a list of potential most limiting parameters. As a non-limiting example, a list of potential most limiting parameters may show AC systems reduce flight range by 3%, a higher altitude reduces flight range of 8%, and high inverter temperatures reduce flight range of 14%. Apparatus 100 may determine high inverter temperatures to be most limiting parameter 124. In embodiments wherein electric aircraft 132 is a hybrid aircraft, most limiting parameter 124 may include an amount of fuel remaining, a fuel level, energy remaining, time of flight remaining, flight range remaining, generator temperature, generator health, and/or the like. The parameters energy remaining, time of flight remaining, and/or flight range remaining may be based on an amount of fuel remaining and/or state of charge of battery pack. For example, most limiting parameter 124 may be based on a combined remaining energy from state of charge of battery pack 140 and remaining fuel. Processor 104 may be configured to determine time of flight remaining and/or flight range remaining from fuel remaining by a data chart listing time of flight remaining and/or flight range remaining for various amounts of fuel remaining. Data chart may be stored, such as in memory 108 or a remote database such as a data chart database, and processor 104 may be configured to retrieve the data chart. In some embodiments, apparatus 100 may utilize a most limiting parameter machine learning model. A most limiting parameter machine learning model may be trained on training data correlating aircraft data to most limiting parameters. Training data may be received from user input, external computing devices, and/or previous iterations of processing. Apparatus 100 may use a most limiting parameter machine learning model to determine most limiting parameter 124.

Still referring to FIG. 1, in some embodiments, apparatus 100 may determine most limiting parameter 124 as a function of an operational threshold. An "operational threshold" as used in this disclosure is a value that if reached triggers a change in a system. An operational threshold may include, but is not limited to, fuel use, temperatures, power output, torques, and the like. As a non-limiting example, apparatus 100 may compare aircraft data 116 to an operational threshold of a voltage of 250V of a rotor. Aircraft data 116 may show that a rotor may be operating at 267V, which may prompt apparatus 100 to determine the rotor to be most limiting parameter 124. In some embodiments, apparatus 100 may communicate most limiting parameter 124 to pilot indicator 128. A "pilot indicator" as used in this disclosure is a device capable of conveying aircraft information to a user. In some cases, a pilot indicator may include a most limiting parameter 124. Pilot indicator 128 may include, but is not limited to, light emitting diode (LED) displays, liquid crystal displays (LCD), and the like. Pilot indicator 128 may include alarms such as, but not limited to, visual alarms, audio alarms, and the like. Apparatus 100 may alarm a user through pilot indicator 128 as a function of a reached operational threshold. As a non-limiting example, an operational threshold may include an altitude of 30,000 ft. Aircraft data 116 may show that an electric aircraft is flying at an altitude of 34,000 ft. Apparatus 100 may alert a user of at least a part of a flight system of an electric aircraft that exceeds an operational threshold, such as torque output of one or more motors resulting in excessive altitude. An alert that may be displayed and/or sounded to a user through pilot indicator 128.

Still referring to FIG. 1, apparatus 100 may generate a power saving flight plan as a function of a comparison of aircraft data 116 to flight confidence parameter 120. A "power saving flight plan" as used in this disclosure is a set of actions that minimizes power usage of an aircraft. A power saving flight plan may include recommendations that may be displayed through pilot indicator 128, such as, but not limited to, turning off lighting systems, turning off AC systems, reducing speed, adjusting flight paths, adjusting flight modes, and the like. As a non-limiting example, a power saving flight plan may include turning off cargo lights, reducing altitude, reducing speed, and taking a more direct route to a destination. Apparatus 100 may be configured to automatically engage in a power saving plan. As a non-limiting example, apparatus 100 may determine electric aircraft 132 is at 30% fuel remaining. Apparatus 100 may automatically reduce high energy consuming operations of electric aircraft 132. In some embodiments, apparatus 100 may present a power saving flight plan to a user through pilot indicator 128. A user may accept or reject a power saving flight plan. In some embodiments, apparatus 100 may utilize a power saving flight plan machine learning model. A power saving flight plan machine learning model may be trained on training data correlating aircraft data to energy saving actions. Training data may be received from user input, external computing devices, and/or previous iterations of processing. Apparatus 100 may determine a power saving flight plan as a function of an output of a power saving flight plan machine learning model.

Still referring to FIG. 1, apparatus 100 may generate a mitigating response. A "mitigating response" as used in this disclosure is an action that reduces a parameter. Apparatus 100 may generate a mitigating response as a function of most limiting parameter 124. For instance and without limitation, most limiting parameter 124 may show battery pack 136 is overheating. Apparatus 100 may generate a mitigating response of reducing speeds, torques, and the like of electric aircraft 132. As another non-limiting example, apparatus 100 may determine most limiting parameter 124 includes an inverter failure. Apparatus 100 may determine a mitigating response includes a switching of a flight mode from cruise and/or fixed wing landings. Apparatus 100 may present a mitigating response to a user, such as through pilot indicator 128. A user may accept a mitigating response, and apparatus 100 may perform the mitigating response. Apparatus 100 may determine a second most limiting parameter and determine a mitigating response of the second most limiting parameter. Apparatus 100 may present a mitigating response of a second most limiting parameter to a user through pilot indicator 128. A process of determining subsequent most limiting parameters and corresponding mitigating responses may be repeated indefinitely, until no most limiting parameter is found, until a user rejects a mitigating response, and/or until no mitigating response is found. Apparatus 100 may utilize a mitigating response machine learning model. A mitigating response machine learning model may be trained with training data correlating aircraft data to most limiting parameters and mitigating responses. Training data may be received from user input, remote computing devices, and/or previous iterations of processing. A mitigating response machine learning model may be configured to input aircraft data and output most limiting parameters and mitigating responses. Apparatus 100 may determine subsequent most limiting parameters and/or mitigation response as a function of a mitigation response machine learning model.

Figure 2:
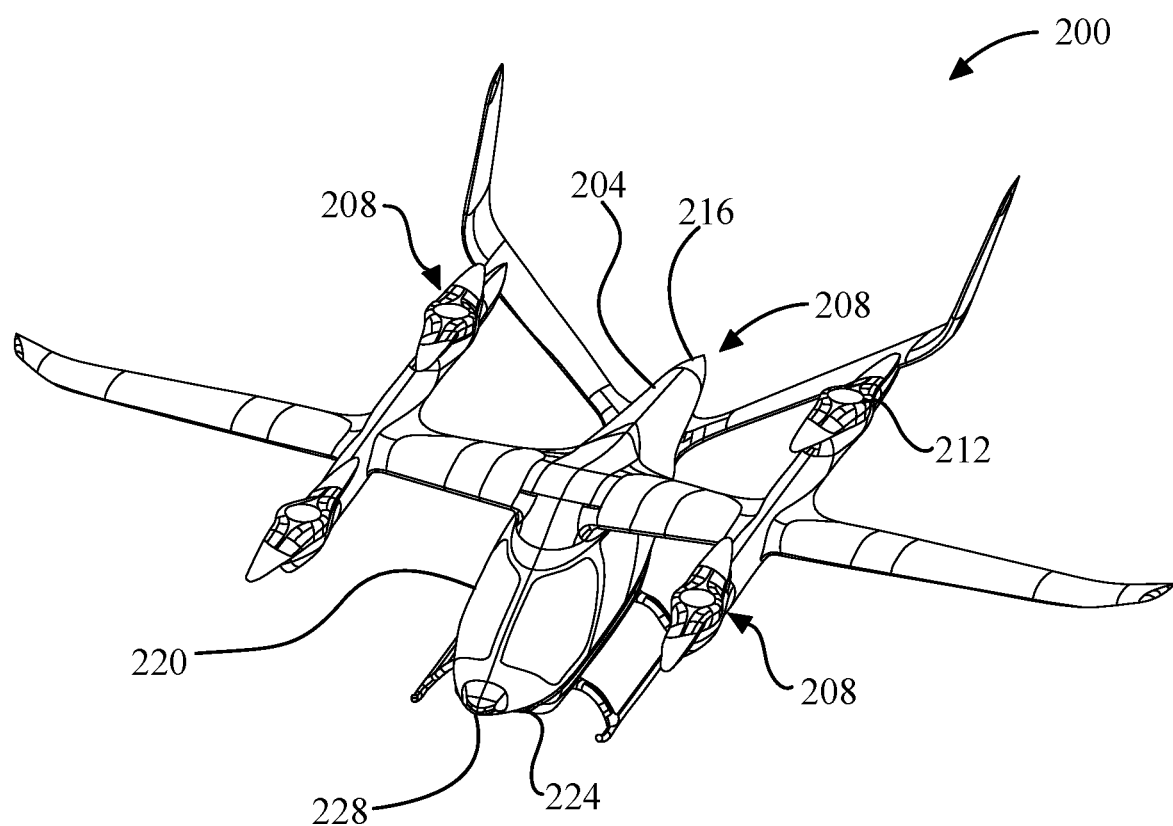
FIG. 2 is an exemplary embodiment of an electric aircraft.

Referring now to FIG. 2, an exemplary embodiment of an electric aircraft 200 is illustrated. Electric aircraft 200, and any of its features, may be used in conjunction with any of the embodiments of the present disclosure. Electric aircraft 200 may include any of the aircrafts as disclosed herein including electric aircraft 132 of FIG. 1. In an embodiment, electric aircraft 200 may be an electric vertical takeoff and landing (eVTOL) aircraft. As used in this disclosure, an "aircraft" is any vehicle that may fly by gaining support from the air. As a non-limiting example, aircraft may include airplanes, helicopters, commercial, personal and/or recreational aircrafts, instrument flight aircrafts, drones, electric aircrafts, airliners, rotorcrafts, vertical takeoff and landing aircrafts, jets, airships, blimps, gliders, paramotors, quadcopters, unmanned aerial vehicles (UAVs) and the like. As used in this disclosure, an "electric aircraft" is an electrically powered aircraft such as one powered by one or more electric motors or the like. In some embodiments, electrically powered (or electric) aircraft may be an electric vertical takeoff and landing (eVTOL) aircraft. Electric aircraft 200 may be capable of rotor-based cruising flight, rotor-based takeoff, rotor-based landing, fixed-wing cruising flight, airplane-style takeoff, airplane-style landing, and/or any combination thereof. Electric aircraft 200 may include one or more manned and/or unmanned aircrafts. Electric aircraft 200 may include one or more all-electric short takeoff and landing (eSTOL) aircrafts. For example, and without limitation, eSTOL aircrafts may accelerate the plane to a flight speed on takeoff and decelerate the plane after landing. In an embodiment, and without limitation, electric aircraft may be configured with an electric propulsion assembly. Including one or more propulsion and/or flight components. Electric propulsion assembly may include any electric propulsion assembly (or system) as described in U.S. application Ser. No. 16/703,225, filed on Dec. 4, 2019, and entitled "AN INTEGRATED ELECTRIC PROPULSION ASSEMBLY," the entirety of which is incorporated herein by reference.

Still referring to FIG. 2, as used in this disclosure, a "vertical take-off and landing (VTOL) aircraft" is one that can hover, take off, and land vertically. An "electric vertical takeoff and landing aircraft" or "eVTOL aircraft", as used in this disclosure, is an electrically powered aircraft typically using an energy source, of a plurality of energy sources to power the aircraft. In order to optimize the power and energy necessary to propel the aircraft, eVTOL may be capable of rotor-based cruising flight, rotor-based takeoff, rotor-based landing, fixed-wing cruising flight, airplane-style takeoff, airplane style landing, and/or any combination thereof. Rotor-based flight, as described herein, is where the aircraft generates lift and propulsion by way of one or more powered rotors or blades coupled with an engine, such as a "quad copter," multi-rotor helicopter, or other vehicle that maintains its lift primarily using downward thrusting propulsors. "Fixed-wing flight", as described herein, is where the aircraft is capable of flight using wings and/or foils that generate lift caused by the aircraft's forward airspeed and the shape of the wings and/or foils, such as airplane-style flight.

Still referring to FIG. 2, electric aircraft 200, in some embodiments, may generally include a fuselage 204, a flight component 208 (or a plurality of flight components 208), a pilot control 220, an aircraft sensor 228 (or a plurality of aircraft sensors 228) and flight controller 224. In one embodiment, flight components 208 may include at least a lift component 212 (or a plurality of lift components 212) and at least a pusher component 216 (or a plurality of pusher components 216). Aircraft sensor(s) 228 may be the same as or similar to aircraft sensor(s) 160 of FIG. 1.

Still referring to FIG. 2, as used in this disclosure a "fuselage" is the main body of an aircraft, or in other words, the entirety of the aircraft except for the cockpit, nose, wings, empennage, nacelles, any and all control surfaces, and generally contains an aircraft's payload. Fuselage 204 may include structural elements that physically support a shape and structure of an aircraft. Structural elements may take a plurality of forms, alone or in combination with other types. Structural elements may vary depending on a construction type of aircraft such as without limitation a fuselage 204. Fuselage 204 may comprise a truss structure. A truss structure may be used with a lightweight aircraft and comprises welded steel tube trusses. A "truss," as used in this disclosure, is an assembly of beams that create a rigid structure, often in combinations of triangles to create three-dimensional shapes. A truss structure may alternatively comprise wood construction in place of steel tubes, or a combination thereof. In embodiments, structural elements may comprise steel tubes and/or wood beams. In an embodiment, and without limitation, structural elements may include an aircraft skin. Aircraft skin may be layered over the body shape constructed by trusses. Aircraft skin may comprise a plurality of materials such as plywood sheets, aluminum, fiberglass, and/or carbon fiber.

Still referring to FIG. 2, it should be noted that an illustrative embodiment is presented only, and this disclosure in no way limits the form or construction method of any of the aircrafts as disclosed herein. In embodiments, fuselage 204 may be configurable based on the needs of the aircraft per specific mission or objective. The general arrangement of components, structural elements, and hardware associated with storing and/or moving a payload may be added or removed from fuselage 204 as needed, whether it is stowed manually, automatedly, or removed by personnel altogether. Fuselage 204 may be configurable for a plurality of storage options. Bulkheads and dividers may be installed and uninstalled as needed, as well as longitudinal dividers where necessary. Bulkheads and dividers may be installed using integrated slots and hooks, tabs, boss and channel, or hardware like bolts, nuts, screws, nails, clips, pins, and/or dowels, to name a few. Fuselage 204 may also be configurable to accept certain specific cargo containers, or a receptable that can, in turn, accept certain cargo containers.

Still referring to FIG. 2, electric aircraft 200 may include a plurality of laterally extending elements attached to fuselage 204. As used in this disclosure a "laterally extending element" is an element that projects essentially horizontally from fuselage, including an outrigger, a spar, and/or a fixed wing that extends from fuselage. Wings may be structures which include airfoils configured to create a pressure differential resulting in lift. Wings may generally dispose on the left and right sides of the aircraft symmetrically, at a point between nose and empennage. Wings may comprise a plurality of geometries in planform view, swept swing, tapered, variable wing, triangular, oblong, elliptical, square, among others. A wing's cross section geometry may comprise an airfoil. An "airfoil" as used in this disclosure is a shape specifically designed such that a fluid flowing above and below it exert differing levels of pressure against the top and bottom surface. In embodiments, the bottom surface of an aircraft can be configured to generate a greater pressure than does the top, resulting in lift. Laterally extending element may comprise differing and/or similar cross-sectional geometries over its cord length or the length from wing tip to where wing meets the aircraft's body. One or more wings may be symmetrical about the aircraft's longitudinal plane, which comprises the longitudinal or roll axis reaching down the center of the aircraft through the nose and empennage, and the plane's yaw axis. Laterally extending element may comprise controls surfaces configured to be commanded by a pilot or pilots to change a wing's geometry and therefore its interaction with a fluid medium, like air. Control surfaces may comprise flaps, ailerons, tabs, spoilers, and slats, among others. The control surfaces may dispose on the wings in a plurality of locations and arrangements and in embodiments may be disposed at the leading and trailing edges of the wings, and may be configured to deflect up, down, forward, aft, or a combination thereof. An aircraft, including a dual-mode aircraft may comprise a combination of control surfaces to perform maneuvers while flying or on ground. In some embodiments, winglets may be provided at terminal ends of the wings which can provide improved aerodynamic efficiency and stability in certain flight situations. In some embodiments, the wings may be foldable to provide a compact aircraft profile, for example, for storage, parking and/or in certain flight modes.

Still referring to FIG. 2, electric aircraft 200 may include a plurality of flight components 208. As used in this disclosure a "flight component" is a component that promotes flight and guidance of an aircraft. Flight component 208 may include power sources, control links to one or more elements, fuses, and/or mechanical couplings used to drive and/or control any other flight component. Flight component 208 may include a motor that operates to move one or more flight control components, to drive one or more propulsors, or the like. A motor may be driven by direct current (DC) electric power and may include, without limitation, brushless DC electric motors, switched reluctance motors, induction motors, or any combination thereof. A motor may also include electronic speed controllers or other components for regulating motor speed, rotation direction, and/or dynamic braking. Flight component 208 may include an energy source. An energy source may include, for example, a generator, a photovoltaic device, a fuel cell such as a hydrogen fuel cell, direct methanol fuel cell, and/or solid oxide fuel cell, an electric energy storage device (e.g. a capacitor, an inductor, and/or a battery). An energy source may also include a battery cell, or a plurality of battery cells connected in series into a module and each module connected in series or in parallel with other modules. Configuration of an energy source containing connected modules may be designed to meet an energy or power requirement and may be designed to fit within a designated footprint in an electric aircraft.

Still referring to FIG. 2, in an embodiment, flight component 208 may be mechanically coupled to an aircraft. As used herein, a person of ordinary skill in the art would understand "mechanically coupled" to mean that at least a portion of a device, component, or circuit is connected to at least a portion of the aircraft via a mechanical coupling. Said mechanical coupling can include, for example, rigid coupling, such as beam coupling, bellows coupling, bushed pin coupling, constant velocity, split-muff coupling, diaphragm coupling, disc coupling, donut coupling, elastic coupling, flexible coupling, fluid coupling, gear coupling, grid coupling, hirth joints, hydrodynamic coupling, jaw coupling, magnetic coupling, Oldham coupling, sleeve coupling, tapered shaft lock, twin spring coupling, rag joint coupling, universal joints, or any combination thereof. In an embodiment, mechanical coupling may be used to connect the ends of adjacent parts and/or objects of an electric aircraft. Further, in an embodiment, mechanical coupling may be used to join two pieces of rotating electric aircraft components.

Still referring to FIG. 2, in an embodiment, plurality of flight components 208 of aircraft 200 may include at least a lift component 212 and at least a pusher component 216. Flight component 208 may include a propulsor, a propeller, a motor, rotor, a rotating element, electrical energy source, battery, and the like, among others. Each flight component may be configured to generate lift and flight of electric aircraft. In some embodiments, flight component 208 may include one or more lift components 212, one or more pusher components 216, one or more battery packs including one or more batteries or cells, and one or more electric motors. Flight component 208 may include a propulsor. As used in this disclosure a "propulsor component" or "propulsor" is a component and/or device used to propel a craft by exerting force on a fluid medium, which may include a gaseous medium such as air or a liquid medium such as water. In an embodiment, when a propulsor twists and pulls air behind it, it may, at the same time, push an aircraft forward with an amount of force and/or thrust. More air pulled behind an aircraft results in greater thrust with which the aircraft is pushed forward. Propulsor component may include any device or component that consumes electrical power on demand to propel an electric aircraft in a direction or other vehicle while on ground or in-flight.

Still referring to FIG. 2, in some embodiments, lift component 212 may include a propulsor, a propeller, a blade, a motor, a rotor, a rotating element, an aileron, a rudder, arrangements thereof, combinations thereof, and the like. Each lift component 212, when a plurality is present, of plurality of flight components 208 is configured to produce, in an embodiment, substantially upward and/or vertical thrust such that aircraft moves upward.

With continued reference to FIG. 2, as used in this disclosure a "lift component" is a component and/or device used to propel a craft upward by exerting downward force on a fluid medium, which may include a gaseous medium such as air or a liquid medium such as water. Lift component 212 may include any device or component that consumes electrical power on demand to propel an electric aircraft in a direction or other vehicle while on ground or in-flight. For example, and without limitation, lift component 212 may include a rotor, propeller, paddle wheel and the like thereof, wherein a rotor is a component that produces torque along the longitudinal axis, and a propeller produces torque along the vertical axis. In an embodiment, lift component 212 includes a plurality of blades. As used in this disclosure a "blade" is a propeller that converts rotary motion from an engine or other power source into a swirling slipstream. In an embodiment, blade may convert rotary motion to push the propeller forwards or backwards. In an embodiment lift component 212 may include a rotating power-driven hub, to which are attached several radial airfoil-section blades such that the whole assembly rotates about a longitudinal axis. Blades may be configured at an angle of attack. In an embodiment, and without limitation, angle of attack may include a fixed angle of attack. As used in this disclosure a "fixed angle of attack" is fixed angle between a chord line of a blade and relative wind. As used in this disclosure a "fixed angle" is an angle that is secured and/or unmovable from the attachment point. In an embodiment, and without limitation, angle of attack may include a variable angle of attack. As used in this disclosure a "variable angle of attack" is a variable and/or moveable angle between a chord line of a blade and relative wind. As used in this disclosure a "variable angle" is an angle that is moveable from an attachment point. In an embodiment, angle of attack be configured to produce a fixed pitch angle. As used in this disclosure a "fixed pitch angle" is a fixed angle between a cord line of a blade and the rotational velocity direction. In an embodiment fixed angle of attack may be manually variable to a few set positions to adjust one or more lifts of the aircraft prior to flight. In an embodiment, blades for an aircraft are designed to be fixed to their hub at an angle similar to the thread on a screw makes an angle to the shaft; this angle may be referred to as a pitch or pitch angle which will determine a speed of forward movement as the blade rotates.

In an embodiment, and still referring to FIG. 2, lift component 212 may be configured to produce a lift. As used in this disclosure a "lift" is a perpendicular force to the oncoming flow direction of fluid surrounding the surface. For example, and without limitation relative air speed may be horizontal to the aircraft, wherein lift force may be a force exerted in a vertical direction, directing the aircraft upwards. In an embodiment, and without limitation, lift component 212 may produce lift as a function of applying a torque to lift component. As used in this disclosure a "torque" is a measure of force that causes an object to rotate about an axis in a direction. For example, and without limitation, torque may rotate an aileron and/or rudder to generate a force that may adjust and/or affect altitude, airspeed velocity, groundspeed velocity, direction during flight, and/or thrust. For example, one or more flight components 208 such as a power source(s) may apply a torque on lift component 212 to produce lift.

In an embodiment and still referring to FIG. 2, a plurality of lift components 212 of plurality of flight components 208 may be arranged in a quad copter orientation. As used in this disclosure a "quad copter orientation" is at least a lift component oriented in a geometric shape and/or pattern, wherein each of the lift components is located along a vertex of the geometric shape. For example, and without limitation, a square quad copter orientation may have four lift propulsor components oriented in the geometric shape of a square, wherein each of the four lift propulsor components are located along the four vertices of the square shape. As a further non-limiting example, a hexagonal quad copter orientation may have six lift components oriented in the geometric shape of a hexagon, wherein each of the six lift components are located along the six vertices of the hexagon shape. In an embodiment, and without limitation, quad copter orientation may include a first set of lift components and a second set of lift components, wherein the first set of lift components and the second set of lift components may include two lift components each, wherein the first set of lift components and a second set of lift components are distinct from one another. For example, and without limitation, the first set of lift components may include two lift components that rotate in a clockwise direction, wherein the second set of lift propulsor components may include two lift components that rotate in a counterclockwise direction. In an embodiment, and without limitation, the first set of lift components may be oriented along a line oriented 45° from the longitudinal axis of aircraft 200. In another embodiment, and without limitation, the second set of lift components may be oriented along a line oriented 135° from the longitudinal axis, wherein the first set of lift components line and the second set of lift components are perpendicular to each other.

Still referring to FIG. 2, pusher component 216 and lift component 212 (of flight component(s) 208) may include any such components and related devices as disclosed in U.S. application Ser. No. 16/427,298, filed on May 30, 2019, entitled "SELECTIVELY DEPLOYABLE HEATED PROPULSOR SYSTEM," U.S. application Ser. No. 16/703,225, filed on Dec. 4, 2019, entitled "AN INTEGRATED ELECTRIC PROPULSION ASSEMBLY," U.S. application Ser. No. 16/910,255, filed on Jun. 24, 2020, entitled "AN INTEGRATED ELECTRIC PROPULSION ASSEMBLY," U.S. application Ser. No. 17/319,155, filed on May 13, 2021, entitled "AIRCRAFT HAVING REVERSE THRUST CAPABILITIES," U.S. application Ser. No. 16/929,206, filed on Jul. 15, 2020, entitled "A HOVER AND THRUST CONTROL ASSEMBLY FOR DUAL-MODE AIRCRAFT," U.S. application Ser. No. 17/001,845, filed on Aug. 25, 2020, entitled "A HOVER AND THRUST CONTROL ASSEMBLY FOR DUAL-MODE AIRCRAFT," U.S. application Ser. No. 17/186,079, filed on Feb. 26, 2021, entitled "METHODS AND SYSTEM FOR ESTIMATING PERCENTAGE TORQUE PRODUCED BY A PROPULSOR CONFIGURED FOR USE IN AN ELECTRIC AIRCRAFT," and U.S. application Ser. No. 17/321,662, filed on May 17, 2021, entitled "AIRCRAFT FOR FIXED PITCH LIFT," the entirety of each one of which is incorporated herein by reference. Any aircrafts, including electric and eVTOL aircrafts, as disclosed in any of these applications may efficaciously be utilized with any of the embodiments as disclosed herein, as needed or desired. Any flight controllers as disclosed in any of these applications may efficaciously be utilized with any of the embodiments as disclosed herein, as needed or desired.

Still referring to FIG. 2, pusher component 216 may include a propulsor, a propeller, a blade, a motor, a rotor, a rotating element, an aileron, a rudder, arrangements thereof, combinations thereof, and the like. Each pusher component 216, when a plurality is present, of the plurality of flight components 208 is configured to produce, in an embodiment, substantially forward and/or horizontal thrust such that the aircraft moves forward.

Still referring to FIG. 2, as used in this disclosure a "pusher component" is a component that pushes and/or thrusts an aircraft through a medium. As a non-limiting example, pusher component 216 may include a pusher propeller, a paddle wheel, a pusher motor, a pusher propulsor, and the like. Additionally, or alternatively, pusher flight component may include a plurality of pusher flight components. Pusher component 216 is configured to produce a forward thrust. As a non-limiting example, forward thrust may include a force to force aircraft to in a horizontal direction along the longitudinal axis. As a further non-limiting example, pusher component 216 may twist and/or rotate to pull air behind it and, at the same time, push aircraft 200 forward with an equal amount of force. In an embodiment, and without limitation, the more air forced behind aircraft, the greater the thrust force with which the aircraft is pushed horizontally will be. In another embodiment, and without limitation, forward thrust may force aircraft 200 through the medium of relative air. Additionally or alternatively, plurality of flight components 208 may include one or more puller components. As used in this disclosure a "puller component" is a component that pulls and/or tows an aircraft through a medium. As a non-limiting example, puller component may include a flight component such as a puller propeller, a puller motor, a tractor propeller, a puller propulsor, and the like. Additionally, or alternatively, puller component may include a plurality of puller flight components.

Still referring to FIG. 2, as used in this disclosure a "power source" is a source that powers, drives and/or controls any flight component and/or other aircraft component. For example, and without limitation power source may include a motor that operates to move one or more lift components 212 and/or one or more pusher components 216, to drive one or more blades, or the like thereof. Motor(s) may be driven by direct current (DC) electric power and may include, without limitation, brushless DC electric motors, switched reluctance motors, induction motors, or any combination thereof. Motor(s) may also include electronic speed controllers or other components for regulating motor speed, rotation direction, and/or dynamic braking. A "motor" as used in this disclosure is any machine that converts non-mechanical energy into mechanical energy. An "electric motor" as used in this disclosure is any machine that converts electrical energy into mechanical energy.

Still referring to FIG. 2, in an embodiment, aircraft 200 may include a pilot control 220. As used in this disclosure, a "pilot control" is a mechanism or means which allows a pilot to monitor and control operation of aircraft such as its flight components (for example, and without limitation, pusher component, lift component and other components such as propulsion components). For example, and without limitation, pilot control 220 may include a collective, inceptor, foot bake, steering and/or control wheel, control stick, pedals, throttle levers, and the like. Pilot control 220 may be configured to translate a pilot's desired torque for each flight component of the plurality of flight components, such as and without limitation, pusher component 216 and lift component 212. Pilot control 220 may be configured to control, via inputs and/or signals such as from a pilot, the pitch, roll, and yaw of the aircraft. Pilot control may be available onboard aircraft or remotely located from it, as needed or desired.

Still referring to FIG. 2, as used in this disclosure a "collective control" or "collective" is a mechanical control of an aircraft that allows a pilot to adjust and/or control the pitch angle of plurality of flight components 208. For example and without limitation, collective control may alter and/or adjust the pitch angle of all of the main rotor blades collectively. For example, and without limitation pilot control 220 may include a yoke control. As used in this disclosure a "yoke control" is a mechanical control of an aircraft to control the pitch and/or roll. For example and without limitation, yoke control may alter and/or adjust the roll angle of aircraft 200 as a function of controlling and/or maneuvering ailerons. In an embodiment, pilot control 220 may include one or more foot-brakes, control sticks, pedals, throttle levels, and the like thereof. In another embodiment, and without limitation, pilot control 220 may be configured to control a principal axis of the aircraft. As used in this disclosure a "principal axis" is an axis in a body representing one three dimensional orientations. For example, and without limitation, principal axis or more yaw, pitch, and/or roll axis. Principal axis may include a yaw axis. As used in this disclosure a "yaw axis" is an axis that is directed towards the bottom of aircraft, perpendicular to the wings. For example, and without limitation, a positive yawing motion may include adjusting and/or shifting nose of aircraft 200 to the right. Principal axis may include a pitch axis. As used in this disclosure a "pitch axis" is an axis that is directed towards the right laterally extending wing of aircraft. For example, and without limitation, a positive pitching motion may include adjusting and/or shifting nose of aircraft 200 upwards. Principal axis may include a roll axis. As used in this disclosure a "roll axis" is an axis that is directed longitudinally towards nose of aircraft, parallel to fuselage. For example, and without limitation, a positive rolling motion may include lifting the left and lowering the right wing concurrently. Pilot control 220 may be configured to modify a variable pitch angle. For example, and without limitation, pilot control 220 may adjust one or more angles of attack of a propulsor or propeller.

Still referring to FIG. 2, aircraft 200 may include at least an aircraft sensor 228. Aircraft sensor 228 may include any sensor or noise monitoring circuit described in this disclosure. Aircraft sensor 228, in some embodiments, may be communicatively connected or coupled to flight controller 224. Aircraft sensor 228 may be configured to sense a characteristic of pilot control 220. Sensor may be a device, module, and/or subsystem, utilizing any hardware, software, and/or any combination thereof to sense a characteristic and/or changes thereof, in an instant environment, for instance without limitation a pilot control 220, which the sensor is proximal to or otherwise in a sensed communication with, and transmit information associated with the characteristic, for instance without limitation digitized data. Sensor 228 may be mechanically and/or communicatively coupled to aircraft 200, including, for instance, to at least a pilot control 220. Aircraft sensor 228 may be configured to sense a characteristic associated with at least a pilot control 220. An environmental sensor may include without limitation one or more sensors used to detect ambient temperature, barometric pressure, and/or air velocity. Aircraft sensor 228 may include without limitation gyroscopes, accelerometers, inertial measurement unit (IMU), and/or magnetic sensors, one or more humidity sensors, one or more oxygen sensors, or the like. Additionally or alternatively, sensor 228 may include at least a geospatial sensor. Aircraft sensor 228 may be located inside aircraft, and/or be included in and/or attached to at least a portion of aircraft. Sensor may include one or more proximity sensors, displacement sensors, vibration sensors, and the like thereof. Sensor may be used to monitor the status of aircraft 200 for both critical and non-critical functions. Sensor may be incorporated into vehicle or aircraft or be remote.

Still referring to FIG. 2, in some embodiments, aircraft sensor 228 may be configured to sense a characteristic associated with any pilot control described in this disclosure. Non-limiting examples of aircraft sensor 228 may include an inertial measurement unit (IMU), an accelerometer, a gyroscope, a proximity sensor, a pressure sensor, a light sensor, a pitot tube, an air speed sensor, a position sensor, a speed sensor, a switch, a thermometer, a strain gauge, an acoustic sensor, and an electrical sensor. In some cases, aircraft sensor 228 may sense a characteristic as an analog measurement, for instance, yielding a continuously variable electrical potential indicative of the sensed characteristic. In these cases, aircraft sensor 228 may additionally comprise an analog to digital converter (ADC) as well as any additionally circuitry, such as without limitation a Wheatstone bridge, an amplifier, a filter, and the like. For instance, in some cases, aircraft sensor 228 may comprise a strain gage configured to determine loading of one or more aircraft components, for instance landing gear. Strain gage may be included within a circuit comprising a Wheatstone bridge, an amplified, and a bandpass filter to provide an analog strain measurement signal having a high signal to noise ratio, which characterizes strain on a landing gear member. An ADC may then digitize analog signal produces a digital signal that can then be transmitted other systems within aircraft 200, for instance without limitation a computing system, a pilot display, and a memory component. Alternatively or additionally, aircraft sensor 228 may sense a characteristic of a pilot control 220 digitally. For instance in some embodiments, aircraft sensor 228 may sense a characteristic through a digital means or digitize a sensed signal natively. In some cases, for example, aircraft sensor 228 may include a rotational encoder and be configured to sense a rotational position of a pilot control; in this case, the rotational encoder digitally may sense rotational "clicks" by any known method, such as without limitation magnetically, optically, and the like. Aircraft sensor 228 may include any of the sensors as disclosed in the present disclosure. Aircraft sensor 228 may include a plurality of sensors. Any of these sensors may be located at any suitable position in or on aircraft 200.

Figure 3:
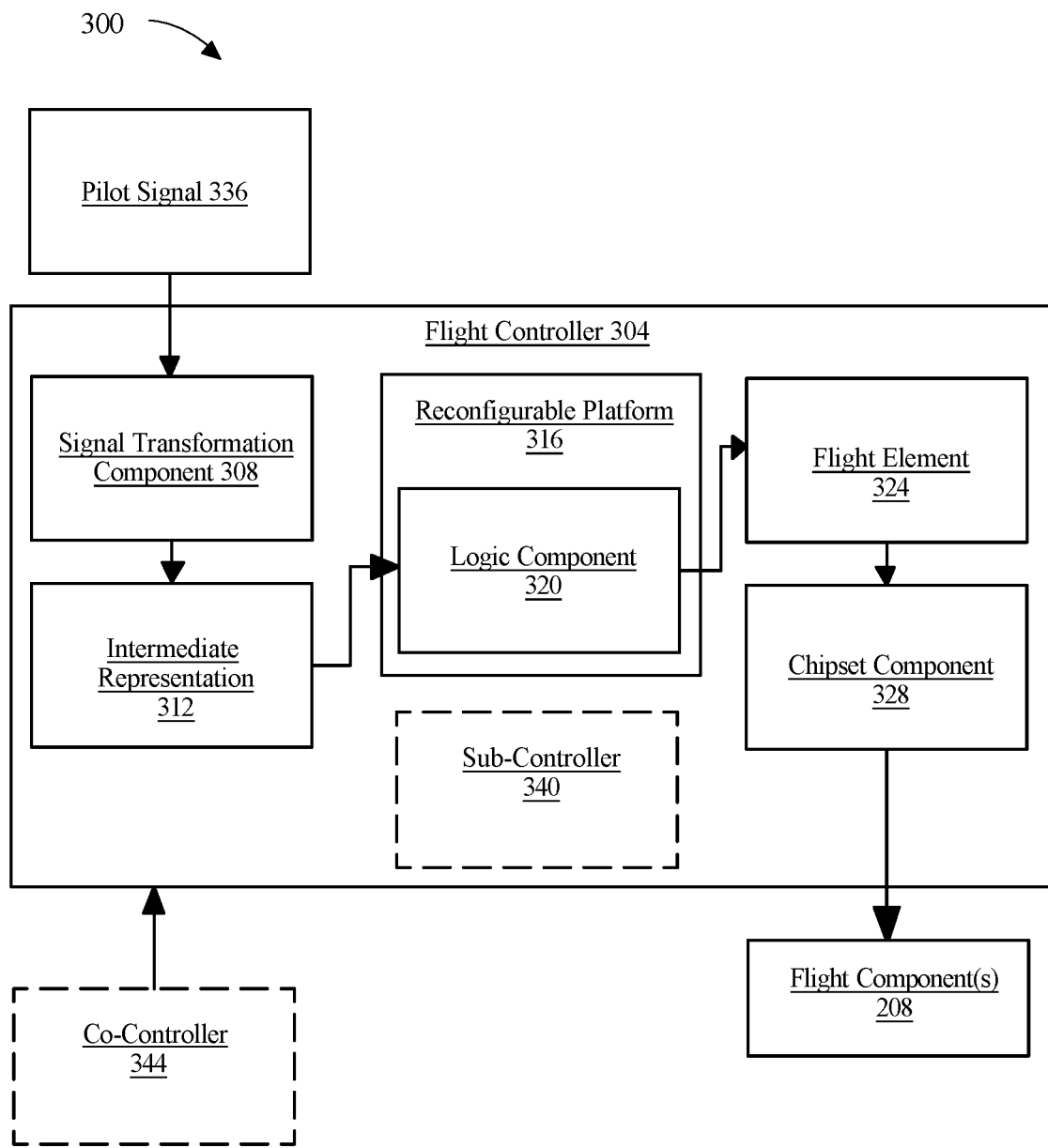
FIG. 3 is an exemplary embodiment of a flight controller.

With continued reference to FIG. 2, in some embodiments, electric aircraft 200 includes, or may be coupled to or communicatively connected to, flight controller 224 which is described further with reference to FIG. 3. As used in this disclosure a "flight controller" is a computing device of a plurality of computing devices dedicated to data storage, security, distribution of traffic for load balancing, and flight instruction. In embodiments, flight controller may be installed in an aircraft, may control the aircraft remotely, and/or may include an element installed in the aircraft and a remote element in communication therewith. Flight controller 224, in an embodiment, is located within fuselage 204 of aircraft. In accordance with some embodiments, flight controller is configured to operate a vertical lift flight (upwards or downwards, that is, takeoff or landing), a fixed wing flight (forward or backwards), a transition between a vertical lift flight and a fixed wing flight, and a combination of a vertical lift flight and a fixed wing flight.

Still referring to FIG. 2, in an embodiment, and without limitation, flight controller 224 may be configured to operate a fixed-wing flight capability. A "fixed-wing flight capability" can be a method of flight wherein the plurality of laterally extending elements generate lift. For example, and without limitation, fixed-wing flight capability may generate lift as a function of an airspeed of aircraft 200 and one or more airfoil shapes of the laterally extending elements. As a further non-limiting example, flight controller 224 may operate the fixed-wing flight capability as a function of reducing applied torque on lift (propulsor) component 212. In an embodiment, and without limitation, an amount of lift generation may be related to an amount of forward thrust generated to increase airspeed velocity, wherein the amount of lift generation may be directly proportional to the amount of forward thrust produced. Additionally or alternatively, flight controller may include an inertia compensator. As used in this disclosure an "inertia compensator" is one or more computing devices, electrical components, logic circuits, processors, and the like there of that are configured to compensate for inertia in one or more lift (propulsor) components present in aircraft 100. Inertia compensator may alternatively or additionally include any computing device used as an inertia compensator as described in U.S. application Ser. No. 17/106,557, filed on Nov. 30, 2020, and entitled "SYSTEM AND METHOD FOR FLIGHT CONTROL IN ELECTRIC AIRCRAFT," the entirety of which is incorporated herein by reference. Flight controller 224 may efficaciously include any flight controllers as disclosed in U.S. Nonprovisional application Ser. No. 17/106,557, filed on Nov. 30, 2020, and entitled "SYSTEM AND METHOD FOR FLIGHT CONTROL IN ELECTRIC AIRCRAFT."

In an embodiment, and still referring to FIG. 2, flight controller 224 may be configured to perform a reverse thrust command. As used in this disclosure a "reverse thrust command" is a command to perform a thrust that forces a medium towards the relative air opposing aircraft 100. Reverse thrust command may alternatively or additionally include any reverse thrust command as described in U.S. application Ser. No. 17/319,155, filed on May 13, 2021, and entitled "AIRCRAFT HAVING REVERSE THRUST CAPABILITIES," the entirety of which is incorporated herein by reference. In another embodiment, flight controller may be configured to perform a regenerative drag operation. As used in this disclosure a "regenerative drag operation" is an operating condition of an aircraft, wherein the aircraft has a negative thrust and/or is reducing in airspeed velocity. For example, and without limitation, regenerative drag operation may include a positive propeller speed and a negative propeller thrust. Regenerative drag operation may alternatively or additionally include any regenerative drag operation as described in U.S. application Ser. No. 17/319,155. Flight controller 224 may efficaciously include any flight controllers as disclosed in U.S. application Ser. No. 17/319, 155, filed on May 13, 2021, and entitled "AIRCRAFT HAVING REVERSE THRUST CAPABILITIES".

In an embodiment, and still referring to FIG. 2, flight controller 224 may be configured to perform a corrective action as a function of a failure event. As used in this disclosure a "corrective action" is an action conducted by the plurality of flight components to correct and/or alter a movement of an aircraft. For example, and without limitation, a corrective action may include an action to reduce a yaw torque generated by a failure event. Additionally or alternatively, corrective action may include any corrective action as described in U.S. Nonprovisional application Ser. No. 17/222,539, filed on Apr. 5, 2021, and entitled "AIRCRAFT FOR SELF-NEUTRALIZING FLIGHT," the entirety of which is incorporated herein by reference. As used in this disclosure a "failure event" is a failure of a lift component of the plurality of lift components. For example, and without limitation, a failure event may denote a rotation degradation of a rotor, a reduced torque of a rotor, and the like thereof. Additionally or alternatively, failure event may include any failure event as described in U.S. application Ser. No. 17/113,647, filed on Dec. 7, 2020, and entitled "IN-FLIGHT STABILIZATION OF AN AIRCRAFT," the entirety of which is incorporated herein by reference. Flight controller 224 may efficaciously include any flight controllers as disclosed in U.S. application Ser. Nos. 17/222,539 and 17/113,647.

With continued reference to FIG. 2, flight controller 224 may include one or more computing devices. Computing device may include any computing device as described in this disclosure. Flight controller 224 may be onboard aircraft 200 and/or flight controller 224 may be remote from aircraft 200, as long as, in some embodiments, flight controller 224 is communicatively connected to aircraft 200. As used in this disclosure, "remote" is a spatial separation between two or more elements, systems, components or devices. Stated differently, two elements may be remote from one another if they are physically spaced apart. In an embodiment, flight controller 224 may include a proportional-integral-derivative (PID) controller.

Now referring to FIG. 3, an exemplary embodiment 300 of a flight controller 304 is illustrated. As used in this disclosure a "flight controller" is a computing device of a plurality of computing devices dedicated to data storage, security, distribution of traffic for load balancing, and flight instruction. Flight controller 304 may include and/or communicate with any computing device as described in this disclosure, including without limitation a microcontroller, microprocessor, digital signal processor (DSP) and/or system on a chip (SoC) as described in this disclosure. Further, flight controller 304 may include a single computing device operating independently, or may include two or more computing device operating in concert, in parallel, sequentially or the like; two or more computing devices may be included together in a single computing device or in two or more computing devices. In embodiments, flight controller 304 may be installed in an aircraft, may control the aircraft remotely, and/or may include an element installed in the aircraft and a remote element in communication therewith.

In an embodiment, and still referring to FIG. 3, flight controller 304 may include a signal transformation component 308. As used in this disclosure a "signal transformation component" is a component that transforms and/or converts a first signal to a second signal, wherein a signal may include one or more digital and/or analog signals. For example, and without limitation, signal transformation component 308 may be configured to perform one or more operations such as preprocessing, lexical analysis, parsing, semantic analysis, and the like thereof. In an embodiment, and without limitation, signal transformation component 308 may include one or more analog-to-digital convertors that transform a first signal of an analog signal to a second signal of a digital signal. For example, and without limitation, an analog-to-digital converter may convert an analog input signal to a 10-bit binary digital representation of that signal. In another embodiment, signal transformation component 308 may include transforming one or more low-level languages such as, but not limited to, machine languages and/or assembly languages. For example, and without limitation, signal transformation component 308 may include transforming a binary language signal to an assembly language signal. In an embodiment, and without limitation, signal transformation component 308 may include transforming one or more high-level languages and/or formal languages such as but not limited to alphabets, strings, and/or languages. For example, and without limitation, high-level languages may include one or more system languages, scripting languages, domain-specific languages, visual languages, esoteric languages, and the like thereof. As a further non-limiting example, high-level languages may include one or more algebraic formula languages, business data languages, string and list languages, object-oriented languages, and the like thereof.

Still referring to FIG. 3, signal transformation component 308 may be configured to optimize an intermediate representation 312. As used in this disclosure an "intermediate representation" is a data structure and/or code that represents the input signal. Signal transformation component 308 may optimize intermediate representation as a function of a data-flow analysis, dependence analysis, alias analysis, pointer analysis, escape analysis, and the like thereof. In an embodiment, and without limitation, signal transformation component 308 may optimize intermediate representation 312 as a function of one or more inline expansions, dead code eliminations, constant propagation, loop transformations, and/or automatic parallelization functions. In another embodiment, signal transformation component 308 may optimize intermediate representation as a function of a machine dependent optimization such as a peephole optimization, wherein a peephole optimization may rewrite short sequences of code into more efficient sequences of code. Signal transformation component 308 may optimize intermediate representation to generate an output language, wherein an "output language," as used herein, is the native machine language of flight controller 304. For example, and without limitation, native machine language may include one or more binary and/or numerical languages.

Still referring to FIG. 3, in an embodiment, and without limitation, signal transformation component 308 may include transform one or more inputs and outputs as a function of an error correction code. An error correction code, also known as error correcting code (ECC), is an encoding of a message or lot of data using redundant information, permitting recovery of corrupted data. An ECC may include a block code, in which information is encoded on fixed-size packets and/or blocks of data elements such as symbols of predetermined size, bits, or the like. Reed-Solomon coding, in which message symbols within a symbol set having q symbols are encoded as coefficients of a polynomial of degree less than or equal to a natural number k, over a finite field F with q elements; strings so encoded have a minimum hamming distance of k+1, and permit correction of (q−k−1)/2 erroneous symbols. Block code may alternatively or additionally be implemented using Golay coding, also known as binary Golay coding, Bose-Chaudhuri, Hocquenghuem (BCH) coding, multidimensional parity-check coding, and/or Hamming codes. An ECC may alternatively or additionally be based on a convolutional code.

In an embodiment, and still referring to FIG. 3, flight controller 304 may include a reconfigurable hardware platform 316. A "reconfigurable hardware platform," as used herein, is a component and/or unit of hardware that may be reprogrammed, such that, for instance, a data path between elements such as logic gates or other digital circuit elements may be modified to change an algorithm, state, logical sequence, or the like of the component and/or unit. This may be accomplished with such flexible high-speed computing fabrics as field-programmable gate arrays (FPGAs), which may include a grid of interconnected logic gates, connections between which may be severed and/or restored to program in modified logic. Reconfigurable hardware platform 316 may be reconfigured to enact any algorithm and/or algorithm selection process received from another computing device and/or created using machine-learning processes.

Still referring to FIG. 3, reconfigurable hardware platform 316 may include a logic component 320. As used in this disclosure a "logic component" is a component that executes instructions on output language. For example, and without limitation, logic component may perform basic arithmetic, logic, controlling, input/output operations, and the like thereof. Logic component 320 may include any suitable processor, such as without limitation a component incorporating logical circuitry for performing arithmetic and logical operations, such as an arithmetic and logic unit (ALU), which may be regulated with a state machine and directed by operational inputs from memory and/or sensors; logic component 320 may be organized according to Von Neumann and/or Harvard architecture as a non-limiting example. Logic component 320 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC). In an embodiment, logic component 320 may include one or more integrated circuit microprocessors, which may contain one or more central processing units, central processors, and/or main processors, on a single metal-oxide-semiconductor chip. Logic component 320 may be configured to execute a sequence of stored instructions to be performed on the output language and/or intermediate representation 312. Logic component 320 may be configured to fetch and/or retrieve the instruction from a memory cache, wherein a "memory cache," as used in this disclosure, is a stored instruction set on flight controller 304. Logic component 320 may be configured to decode the instruction retrieved from the memory cache to opcodes and/or operands. Logic component 320 may be configured to execute the instruction on intermediate representation 312 and/or output language. For example, and without limitation, logic component 320 may be configured to execute an addition operation on intermediate representation 312 and/or output language.

In an embodiment, and without limitation, logic component 320 may be configured to calculate a flight element 324. As used in this disclosure a "flight element" is an element of datum denoting a relative status of aircraft. For example, and without limitation, flight element 324 may denote one or more torques, thrusts, airspeed velocities, forces, altitudes, groundspeed velocities, directions during flight, directions facing, forces, orientations, and the like thereof. For example, and without limitation, flight element 324 may denote that aircraft is cruising at an altitude and/or with a sufficient magnitude of forward thrust. As a further non-limiting example, flight status may denote that is building thrust and/or groundspeed velocity in preparation for a takeoff. As a further non-limiting example, flight element 324 may denote that aircraft is following a flight path accurately and/or sufficiently.

Still referring to FIG. 3, flight controller 304 may include a chipset component 328. As used in this disclosure a "chipset component" is a component that manages data flow. In an embodiment, and without limitation, chipset component 328 may include a northbridge data flow path, wherein the northbridge dataflow path may manage data flow from logic component 320 to a high-speed device and/or component, such as a RAM, graphics controller, and the like thereof. In another embodiment, and without limitation, chipset component 328 may include a southbridge data flow path, wherein the southbridge dataflow path may manage data flow from logic component 320 to lower-speed peripheral buses, such as a peripheral component interconnect (PCI), industry standard architecture (ICA), and the like thereof. In an embodiment, and without limitation, southbridge data flow path may include managing data flow between peripheral connections such as ethernet, USB, audio devices, and the like thereof. Additionally or alternatively, chipset component 328 may manage data flow between logic component 320, memory cache, and a flight component 208. As used in this disclosure (and with particular reference to FIG. 3) a "flight component" is a portion of an aircraft that can be moved or adjusted to affect one or more flight elements. For example, flight component 208 may include a component used to affect the aircrafts' roll and pitch which may comprise one or more ailerons. As a further example, flight component 208 may include a rudder to control yaw of an aircraft. In an embodiment, chipset component 328 may be configured to communicate with a plurality of flight components as a function of flight element 324. For example, and without limitation, chipset component 328 may transmit to an aircraft rotor to reduce torque of a first lift propulsor and increase the forward thrust produced by a pusher component to perform a flight maneuver.

In an embodiment, and still referring to FIG. 3, flight controller 304 may be configured generate an autonomous function. As used in this disclosure an "autonomous function" is a mode and/or function of flight controller 304 that controls aircraft automatically. For example, and without limitation, autonomous function may perform one or more aircraft maneuvers, take offs, landings, altitude adjustments, flight leveling adjustments, turns, climbs, and/or descents. As a further non-limiting example, autonomous function may adjust one or more airspeed velocities, thrusts, torques, and/or groundspeed velocities. As a further non-limiting example, autonomous function may perform one or more flight path corrections and/or flight path modifications as a function of flight element 324. In an embodiment, autonomous function may include one or more modes of autonomy such as, but not limited to, autonomous mode, semi-autonomous mode, and/or non-autonomous mode. As used in this disclosure "autonomous mode" is a mode that automatically adjusts and/or controls aircraft and/or the maneuvers of aircraft in its entirety. For example, autonomous mode may denote that flight controller 304 will adjust the aircraft. As used in this disclosure a "semi-autonomous mode" is a mode that automatically adjusts and/or controls a portion and/or section of aircraft. For example, and without limitation, semi-autonomous mode may denote that a pilot will control the propulsors, wherein flight controller 304 will control the ailerons and/or rudders. As used in this disclosure "non-autonomous mode" is a mode that denotes a pilot will control aircraft and/or maneuvers of aircraft in its entirety.

In an embodiment, and still referring to FIG. 3, flight controller 304 may generate autonomous function as a function of an autonomous machine-learning model. As used in this disclosure an "autonomous machine-learning model" is a machine-learning model to produce an autonomous function output given flight element 324 and a pilot signal 336 as inputs; this is in contrast to a non-machine learning software program where the commands to be executed are determined in advance by a user and written in a programming language. As used in this disclosure a "pilot signal" is an element of datum representing one or more functions a pilot is controlling and/or adjusting. For example, pilot signal 336 may denote that a pilot is controlling and/or maneuvering ailerons, wherein the pilot is not in control of the rudders and/or propulsors. In an embodiment, pilot signal 336 may include an implicit signal and/or an explicit signal. For example, and without limitation, pilot signal 336 may include an explicit signal, wherein the pilot explicitly states there is a lack of control and/or desire for autonomous function. As a further non-limiting example, pilot signal 336 may include an explicit signal directing flight controller 304 to control and/or maintain a portion of aircraft, a portion of the flight plan, the entire aircraft, and/or the entire flight plan. As a further non-limiting example, pilot signal 336 may include an implicit signal, wherein flight controller 304 detects a lack of control such as by a malfunction, torque alteration, flight path deviation, and the like thereof. In an embodiment, and without limitation, pilot signal 336 may include one or more explicit signals to reduce torque, and/or one or more implicit signals that torque may be reduced due to reduction of airspeed velocity. In an embodiment, and without limitation, pilot signal 336 may include one or more local and/or global signals. For example, and without limitation, pilot signal 336 may include a local signal that is transmitted by a pilot and/or crew member. As a further non-limiting example, pilot signal 336 may include a global signal that is transmitted by air traffic control and/or one or more remote users that are in communication with the pilot of aircraft. In an embodiment, pilot signal 336 may be received as a function of a tri-state bus and/or multiplexor that denotes an explicit pilot signal should be transmitted prior to any implicit or global pilot signal.

Still referring to FIG. 3, autonomous machine-learning model may include one or more autonomous machine-learning processes such as supervised, unsupervised, or reinforcement machine-learning processes that flight controller 304 and/or a remote device may or may not use in the generation of autonomous function. As used in this disclosure "remote device" is an external device to flight controller 304. Additionally or alternatively, autonomous machine-learning model may include one or more autonomous machine-learning processes that a field-programmable gate array (FPGA) may or may not use in the generation of autonomous function. Autonomous machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

In an embodiment, and still referring to FIG. 3, autonomous machine learning model may be trained as a function of autonomous training data, wherein autonomous training data may correlate a flight element, pilot signal, and/or simulation data to an autonomous function. For example, and without limitation, a flight element of an airspeed velocity, a pilot signal of limited and/or no control of propulsors, and a simulation data of required airspeed velocity to reach the destination may result in an autonomous function that includes a semi-autonomous mode to increase thrust of the propulsors. Autonomous training data may be received as a function of user-entered valuations of flight elements, pilot signals, simulation data, and/or autonomous functions. Flight controller 304 may receive autonomous training data by receiving correlations of flight element, pilot signal, and/or simulation data to an autonomous function that were previously received and/or determined during a previous iteration of generation of autonomous function. Autonomous training data may be received by one or more remote devices and/or FPGAs that at least correlate a flight element, pilot signal, and/or simulation data to an autonomous function. Autonomous training data may be received in the form of one or more user-entered correlations of a flight element, pilot signal, and/or simulation data to an autonomous function.

Still referring to FIG. 3, flight controller 304 may receive autonomous machine-learning model from a remote device and/or FPGA that utilizes one or more autonomous machine learning processes, wherein a remote device and an FPGA is described above in detail. For example, and without limitation, a remote device may include a computing device, external device, processor, FPGA, microprocessor and the like thereof. Remote device and/or FPGA may perform the autonomous machine-learning process using autonomous training data to generate autonomous function and transmit the output to flight controller 304. Remote device and/or FPGA may transmit a signal, bit, datum, or parameter to flight controller 304 that at least relates to autonomous function. Additionally or alternatively, the remote device and/or FPGA may provide an updated machine-learning model. For example, and without limitation, an updated machine-learning model may be comprised of a firmware update, a software update, an autonomous machine-learning process correction, and the like thereof. As a non-limiting example a software update may incorporate a new simulation data that relates to a modified flight element. Additionally or alternatively, the updated machine learning model may be transmitted to the remote device and/or FPGA, wherein the remote device and/or FPGA may replace the autonomous machine-learning model with the updated machine-learning model and generate the autonomous function as a function of the flight element, pilot signal, and/or simulation data using the updated machine-learning model. The updated machine-learning model may be transmitted by the remote device and/or FPGA and received by flight controller 304 as a software update, firmware update, or corrected autonomous machine-learning model. For example, and without limitation autonomous machine learning model may utilize a neural net machine-learning process, wherein the updated machine-learning model may incorporate a gradient boosting machine-learning process.

Still referring to FIG. 3, flight controller 304 may include, be included in, and/or communicate with a mobile device such as a mobile telephone or smartphone. Further, flight controller may communicate with one or more additional devices as described below in further detail via a network interface device. The network interface device may be utilized for commutatively connecting a flight controller to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. The network may include any network topology and can may employ a wired and/or a wireless mode of communication.

In an embodiment, and still referring to FIG. 3, flight controller 304 may include, but is not limited to, for example, a cluster of flight controllers in a first location and a second flight controller or cluster of flight controllers in a second location. Flight controller 304 may include one or more flight controllers dedicated to data storage, security, distribution of traffic for load balancing, and the like. Flight controller 304 may be configured to distribute one or more computing tasks as described below across a plurality of flight controllers, which may operate in parallel, in series, redundantly, or in any other manner used for distribution of tasks or memory between computing devices. For example, and without limitation, flight controller 304 may implement a control algorithm to distribute and/or command the plurality of flight controllers. As used in this disclosure a "control algorithm" is a finite sequence of well-defined computer implementable instructions that may determine the flight component of the plurality of flight components to be adjusted. For example, and without limitation, control algorithm may include one or more algorithms that reduce and/or prevent aviation asymmetry. As a further non-limiting example, control algorithms may include one or more models generated as a function of a software including, but not limited to Simulink by MathWorks, Natick, Massachusetts, USA. In an embodiment, and without limitation, control algorithm may be configured to generate an auto-code, wherein an "auto-code," is used herein, is a code and/or algorithm that is generated as a function of the one or more models and/or software's. In another embodiment, control algorithm may be configured to produce a segmented control algorithm. As used in this disclosure a "segmented control algorithm" is control algorithm that has been separated and/or parsed into discrete sections. For example, and without limitation, segmented control algorithm may parse control algorithm into two or more segments, wherein each segment of control algorithm may be performed by one or more flight controllers operating on distinct flight components.

In an embodiment, and still referring to FIG. 3, control algorithm may be configured to determine a segmentation boundary as a function of segmented control algorithm. As used in this disclosure a "segmentation boundary" is a limit and/or delineation associated with the segments of the segmented control algorithm. For example, and without limitation, segmentation boundary may denote that a segment in the control algorithm has a first starting section and/or a first ending section. As a further non-limiting example, segmentation boundary may include one or more boundaries associated with an ability of flight component 208. In an embodiment, control algorithm may be configured to create an optimized signal communication as a function of segmentation boundary. For example, and without limitation, optimized signal communication may include identifying the discrete timing required to transmit and/or receive the one or more segmentation boundaries. In an embodiment, and without limitation, creating optimized signal communication further comprises separating a plurality of signal codes across the plurality of flight controllers. For example, and without limitation the plurality of flight controllers may include one or more formal networks, wherein formal networks transmit data along an authority chain and/or are limited to task-related communications. As a further non-limiting example, communication network may include informal networks, wherein informal networks transmit data in any direction. In an embodiment, and without limitation, the plurality of flight controllers may include a chain path, wherein a "chain path," as used herein, is a linear communication path comprising a hierarchy that data may flow through. In an embodiment, and without limitation, the plurality of flight controllers may include an all-channel path, wherein an "all-channel path," as used herein, is a communication path that is not restricted to a particular direction. For example, and without limitation, data may be transmitted upward, downward, laterally, and the like thereof. In an embodiment, and without limitation, the plurality of flight controllers may include one or more neural networks that assign a weighted value to a transmitted datum. For example, and without limitation, a weighted value may be assigned as a function of one or more signals denoting that a flight component is malfunctioning and/or in a failure state.

Still referring to FIG. 3, the plurality of flight controllers may include a master bus controller. As used in this disclosure a "master bus controller" is one or more devices and/or components that are connected to a bus to initiate a direct memory access transaction, wherein a bus is one or more terminals in a bus architecture. Master bus controller may communicate using synchronous and/or asynchronous bus control protocols. In an embodiment, master bus controller may include flight controller 304. In another embodiment, master bus controller may include one or more universal asynchronous receiver-transmitters (UART). For example, and without limitation, master bus controller may include one or more bus architectures that allow a bus to initiate a direct memory access transaction from one or more buses in the bus architectures. As a further non-limiting example, master bus controller may include one or more peripheral devices and/or components to communicate with another peripheral device and/or component and/or the master bus controller. In an embodiment, master bus controller may be configured to perform bus arbitration. As used in this disclosure "bus arbitration" is method and/or scheme to prevent multiple buses from attempting to communicate with and/or connect to master bus controller. For example and without limitation, bus arbitration may include one or more schemes such as a small computer interface system, wherein a small computer interface system is a set of standards for physical connecting and transferring data between peripheral devices and master bus controller by defining commands, protocols, electrical, optical, and/or logical interfaces. In an embodiment, master bus controller may receive intermediate representation 312 and/or output language from logic component 320, wherein output language may include one or more analog-to-digital conversions, low bit rate transmissions, message encryptions, digital signals, binary signals, logic signals, analog signals, and the like thereof described above in detail.

Still referring to FIG. 3, master bus controller may communicate with a slave bus. As used in this disclosure a "slave bus" is one or more peripheral devices and/or components that initiate a bus transfer. For example, and without limitation, slave bus may receive one or more controls and/or asymmetric communications from master bus controller, wherein slave bus transfers data stored to master bus controller. In an embodiment, and without limitation, slave bus may include one or more internal buses, such as but not limited to a/an internal data bus, memory bus, system bus, front-side bus, and the like thereof. In another embodiment, and without limitation, slave bus may include one or more external buses such as external flight controllers, external computers, remote devices, printers, aircraft computer systems, flight control systems, and the like thereof.

In an embodiment, and still referring to FIG. 3, control algorithm may optimize signal communication as a function of determining one or more discrete timings. For example, and without limitation master bus controller may synchronize timing of the segmented control algorithm by injecting high priority timing signals on a bus of the master bus control. As used in this disclosure a "high priority timing signal" is information denoting that the information is important. For example, and without limitation, high priority timing signal may denote that a section of control algorithm is of high priority and should be analyzed and/or transmitted prior to any other sections being analyzed and/or transmitted. In an embodiment, high priority timing signal may include one or more priority packets. As used in this disclosure a "priority packet" is a formatted unit of data that is communicated between the plurality of flight controllers. For example, and without limitation, priority packet may denote that a section of control algorithm should be used and/or is of greater priority than other sections.

Still referring to FIG. 3, flight controller 304 may also be implemented using a "shared nothing" architecture in which data is cached at the worker, in an embodiment, this may enable scalability of aircraft and/or computing device. Flight controller 304 may include a distributer flight controller. As used in this disclosure a "distributer flight controller" is a component that adjusts and/or controls a plurality of flight components as a function of a plurality of flight controllers. For example, distributer flight controller may include a flight controller that communicates with a plurality of additional flight controllers and/or clusters of flight controllers. In an embodiment, distributed flight control may include one or more neural networks. For example, neural network also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, a node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above. In an embodiment, and without limitation, a neural network may receive semantic units as inputs and output vectors representing such semantic units according to weights $w_i$ that are derived using machine-learning processes as described in this disclosure.

Still referring to FIG. 3, flight controller may include a sub-controller 340. As used in this disclosure a "sub-controller" 340 is a controller and/or component that is part of a distributed controller as described above; for instance, flight controller 304 may be and/or include a distributed flight controller made up of one or more sub-controllers. For example, and without limitation, sub-controller 340 may include any controllers and/or components thereof that are similar to distributed flight controller and/or flight controller as described above. Sub-controller 340 may include any component of any flight controller as described above. Sub-controller 340 may be implemented in any manner suitable for implementation of a flight controller as described above. As a further non-limiting example, sub-controller 340 may include one or more processors, logic components and/or computing devices capable of receiving, processing, and/or transmitting data across the distributed flight controller as described above. As a further non-limiting example, sub-controller 340 may include a controller that receives a signal from a first flight controller and/or first distributed flight controller component and transmits the signal to a plurality of additional sub-controllers and/or flight components.

Still referring to FIG. 3, flight controller may include a co-controller 344. As used in this disclosure a "co-controller" is a controller and/or component that joins flight controller 304 as components and/or nodes of a distributer flight controller as described above. For example, and without limitation, co-controller 344 may include one or more controllers and/or components that are similar to flight controller 304. As a further non-limiting example, co-controller 344 may include any controller and/or component that joins flight controller 304 to distributer flight controller. As a further non-limiting example, co-controller 344 may include one or more processors, logic components and/or computing devices capable of receiving, processing, and/or transmitting data to and/or from flight controller 304 to distributed flight control system. Co-controller 344 may include any component of any flight controller as described above. Co-controller 344 may be implemented in any manner suitable for implementation of a flight controller as described above.

In an embodiment, and with continued reference to FIG. 3, flight controller 304 may be designed and/or configured to perform any method, method step, or sequence of method steps in any embodiment described in this disclosure, in any order and with any degree of repetition. For instance, flight controller 304 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 4:
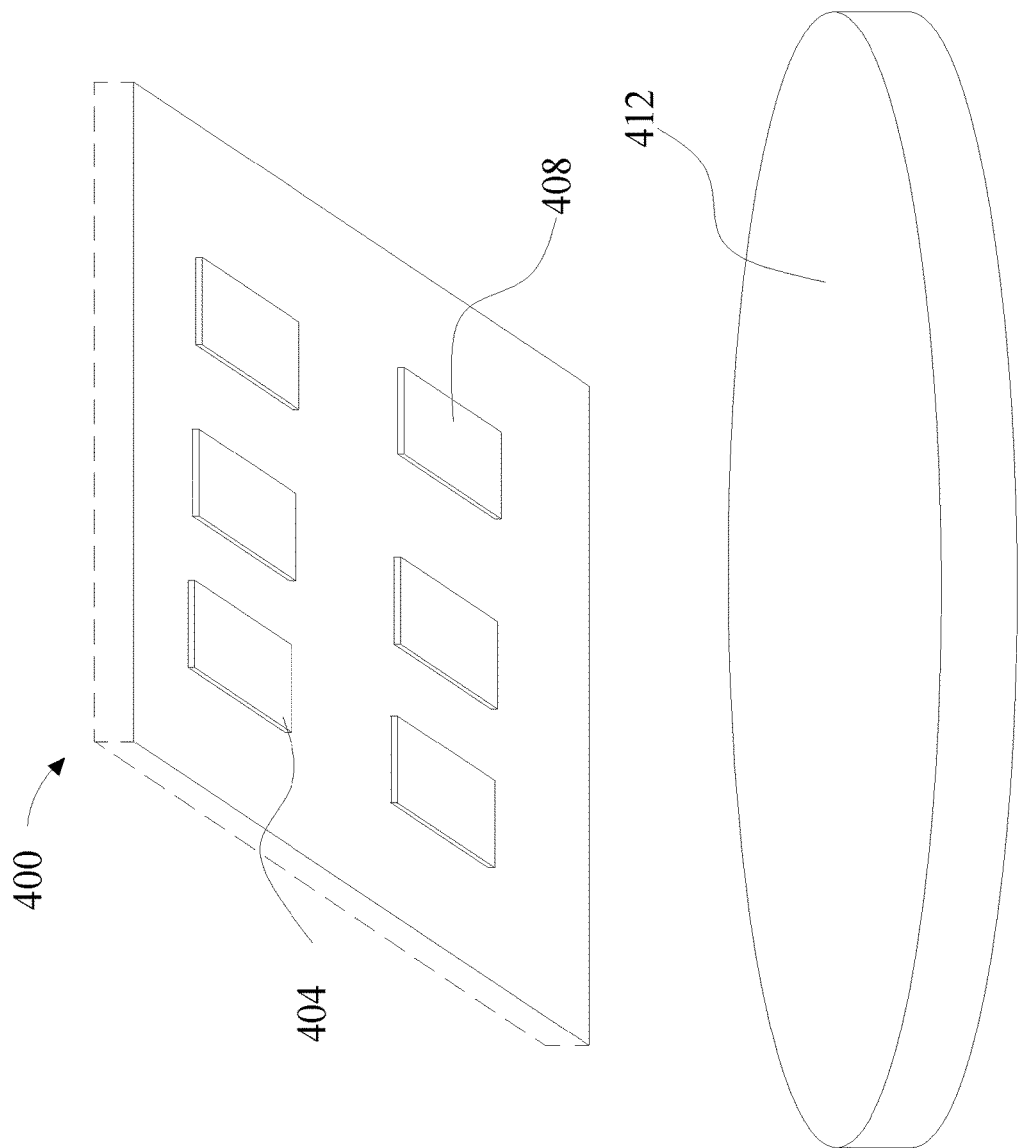
FIG. 4 is an exemplary embodiment of a sensor suite.

Referring now to FIG. 4, an embodiment of sensor suite 400 is presented. The herein disclosed system and method may comprise a plurality of sensors in the form of individual sensors or a sensor suite working in tandem or individually. A sensor suite may include a plurality of independent sensors, as described herein, where any number of the described sensors may be used to detect any number of physical or electrical quantities associated with an aircraft power system or an electrical energy storage system. Independent sensors may include separate sensors measuring physical or electrical quantities that may be powered by and/or in communication with circuits independently, where each may signal sensor output to a control circuit such as a user graphical interface. In a non-limiting example, there may be four independent sensors housed in and/or on battery pack 424 measuring temperature, electrical characteristic such as voltage, amperage, resistance, or impedance, or any other parameters and/or quantities as described in this disclosure. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability of battery management system 400 and/or user to detect phenomenon is maintained and in a non-limiting example, a user alter aircraft usage pursuant to sensor readings.

Still referring to FIG. 4, sensor suite 400 may include a moisture sensor 404. "Moisture", as used in this disclosure, is the presence of water, this may include vaporized water in air, condensation on the surfaces of objects, or concentrations of liquid water. Moisture may include humidity. "Humidity", as used in this disclosure, is the property of a gaseous medium (almost always air) to hold water in the form of vapor. An amount of water vapor contained within a parcel of air can vary significantly. Water vapor is generally invisible to the human eye and may be damaging to electrical components. There are three primary measurements of humidity, absolute, relative, specific humidity. "Absolute humidity," for the purposes of this disclosure, describes the water content of air and is expressed in either grams per cubic meters or grams per kilogram. "Relative humidity", for the purposes of this disclosure, is expressed as a percentage, indicating a present stat of absolute humidity relative to a maximum humidity given the same temperature. "Specific humidity", for the purposes of this disclosure, is the ratio of water vapor mass to total moist air parcel mass, where parcel is a given portion of a gaseous medium. Moisture sensor 404 may be psychrometer. Moisture sensor 404 may be a hygrometer. Moisture sensor 404 may be configured to act as or include a humidistat. A "humidistat", for the purposes of this disclosure, is a humidity-triggered switch, often used to control another electronic device. Moisture sensor 404 may use capacitance to measure relative humidity and include in itself, or as an external component, include a device to convert relative humidity measurements to absolute humidity measurements. "Capacitance", for the purposes of this disclosure, is the ability of a system to store an electric charge, in this case the system is a parcel of air which may be near, adjacent to, or above a battery cell.

With continued reference to FIG. 4, sensor suite 400 may include electrical sensors 408. Electrical sensors 408 may be configured to measure voltage across a component, electrical current through a component, and resistance of a component. Electrical sensors 408 may include separate sensors to measure each of the previously disclosed electrical characteristics such as voltmeter, ammeter, and ohmmeter, respectively.

Alternatively or additionally, and with continued reference to FIG. 4, sensor suite 400 include a sensor or plurality thereof that may detect voltage and direct the charging of individual battery cells according to charge level; detection may be performed using any suitable component, set of components, and/or mechanism for direct or indirect measurement and/or detection of voltage levels, including without limitation comparators, analog to digital converters, any form of voltmeter, or the like. Sensor suite 400 and/or a control circuit incorporated therein and/or communicatively connected thereto may be configured to adjust charge to one or more battery cells as a function of a charge level and/or a detected parameter. For instance, and without limitation, sensor suite 400 may be configured to determine that a charge level of a battery cell is high based on a detected voltage level of that battery cell or portion of the battery pack. Sensor suite 400 may alternatively or additionally detect a charge reduction event, defined for purposes of this disclosure as any temporary or permanent state of a battery cell requiring reduction or cessation of charging; a charge reduction event may include a cell being fully charged and/or a cell undergoing a physical and/or electrical process that makes continued charging at a current voltage and/or current level inadvisable due to a risk that the cell will be damaged, will overheat, or the like. Detection of a charge reduction event may include detection of a temperature, of the cell above a threshold level, detection of a voltage and/or resistance level above or below a threshold, or the like. Sensor suite 400 may include digital sensors, analog sensors, or a combination thereof. Sensor suite 400 may include digital-to-analog converters (DAC), analog-to-digital converters (ADC, A/D, A-to-D), a combination thereof, or other signal conditioning components used in transmission of a first plurality of battery pack data 428 to a destination over wireless or wired connection.

With continued reference to FIG. 4, sensor suite 400 may include thermocouples, thermistors, thermometers, passive infrared sensors, resistance temperature sensors (RTD's), semiconductor based integrated circuits (IC), a combination thereof or another undisclosed sensor type, alone or in combination. Temperature, for the purposes of this disclosure, and as would be appreciated by someone of ordinary skill in the art, is a measure of the heat energy of a system. Temperature, as measured by any number or combinations of sensors present within sensor suite 400, may be measured in Fahrenheit (° F.), Celsius (° C.), Kelvin (° K), or another scale alone or in combination. The temperature measured by sensors may comprise electrical signals which are transmitted to their appropriate destination wireless or through a wired connection.

With continued reference to FIG. 4, sensor suite 400 may include a sensor configured to detect gas that may be emitted during or after a cell failure. "Cell failure", for the purposes of this disclosure, refers to a malfunction of a battery cell, which may be an electrochemical cell, that renders the cell inoperable for its designed function, namely providing electrical energy to at least a portion of an electric aircraft. Byproducts of cell failure 412 may include gaseous discharge including oxygen, hydrogen, carbon dioxide, methane, carbon monoxide, a combination thereof, or another undisclosed gas, alone or in combination. Further the sensor configured to detect vent gas from electrochemical cells may comprise a gas detector. For the purposes of this disclosure, a "gas detector" is a device used to detect a gas is present in an area. Gas detectors, and more specifically, the gas sensor that may be used in sensor suite 400, may be configured to detect combustible, flammable, toxic, oxygen depleted, a combination thereof, or another type of gas alone or in combination. The gas sensor that may be present in sensor suite 400 may include a combustible gas, photoionization detectors, electrochemical gas sensors, ultrasonic sensors, metal-oxide-semiconductor (MOS) sensors, infrared imaging sensors, a combination thereof, or another undisclosed type of gas sensor alone or in combination. Sensor suite 400 may include sensors that are configured to detect non-gaseous byproducts of cell failure 412 including, in non-limiting examples, liquid chemical leaks including aqueous alkaline solution, ionomer, molten phosphoric acid, liquid electrolytes with redox shuttle and ionomer, and salt water, among others. Sensor suite 400 may include sensors that are configured to detect non-gaseous byproducts of cell failure 412 including, in non-limiting examples, electrical anomalies as detected by any of the previous disclosed sensors or components.

With continued reference to FIG. 4, sensor suite 400 may be configured to detect events where voltage nears an upper voltage threshold or lower voltage threshold. An upper voltage threshold may be stored in a data storage system for comparison with an instant measurement taken by any combination of sensors present within sensor suite 400. An upper voltage threshold may be calculated and calibrated based on factors relating to battery cell health, maintenance history, location within battery pack, designed application, and type, among others. Sensor suite 400 may measure voltage at an instant, over a period of time, or periodically. Sensor suite 400 may be configured to operate at any of these detection modes, switch between modes, or simultaneous measure in more than one mode. A lower voltage threshold may indicate power loss to or from an individual battery cell or portion of the battery pack. Events where voltage exceeds the upper and lower voltage threshold may indicate battery cell failure or electrical anomalies that could lead to potentially dangerous situations for aircraft and personnel that may be present in or near its operation.

Figure 5:
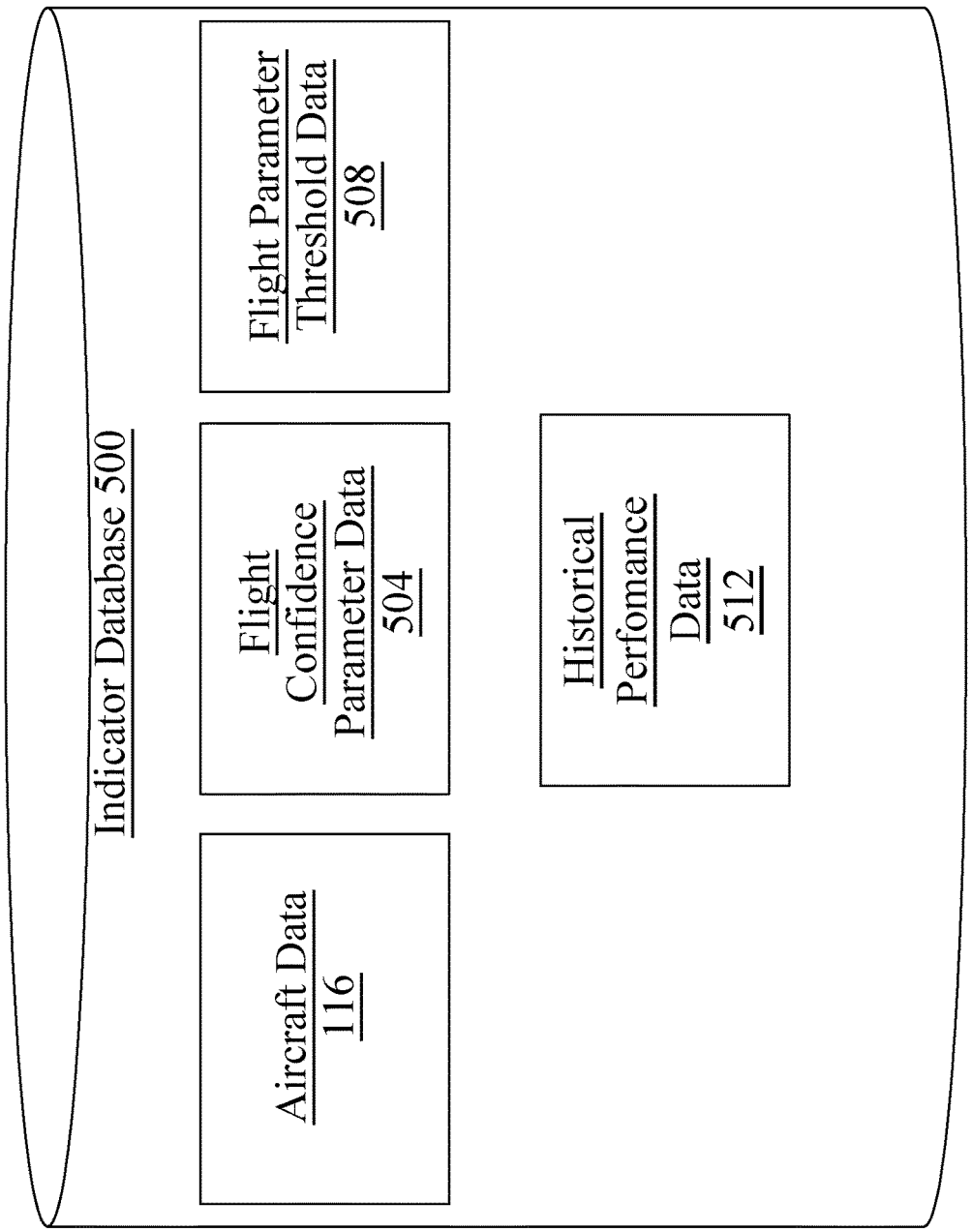
FIG. 5 is an exemplary embodiment of an indicator database.

Referring now to FIG. 5, indicator database 500 is presented. Database may be implemented, without limitation, as a relational database, a key-value retrieval database such as a NOSQL database, or any other format or structure for use as a database that a person skilled in the art would recognize as suitable upon review of the entirety of this disclosure. Database may alternatively or additionally be implemented using a distributed data storage protocol and/or data structure, such as a distributed hash table or the like. Database may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

Still referring to FIG. 5, indicator database 500 may include aircraft data 116. Aircraft data 116 may include, but is not limited to, altitude, aircraft speed, rotor torques, temperatures, flight modes, battery health, battery state of charge, and the like. Aircraft data 116 may be as described above.

Still referring to FIG. 5, indicator database 500 may include flight confidence parameter data 504. Flight confidence parameter data 504 may include information of flight confidence parameters. Flight confidence parameter data 504 may include, but is not limited to, temperatures, torques, battery health, battery state of charge, inverter temperature, power dissipation levels, rotor and/or motor temperatures, altitudes, aircraft speeds, flight modes, and the like. Flight confidence parameter data 504 may be updated by user input, an external computing device, and/or from iterations of flight of an electric aircraft. As a non-limiting example, an electric aircraft may initially have a base flight confidence parameter of inverter temperatures of 40 degrees Celsius. An electric aircraft may be shown to optimally fly with inverter temperatures of 34 degrees Celsius, in which case flight confidence parameter data 504 may update with the inverter temperature of 34 degrees Celsius. Flight confidence parameters may be determined by an optimization model and/or machine learning model as described above with reference to FIG. 1.

Still referring to FIG. 5, indicator database 500 may include flight parameter threshold data 508. Flight parameter threshold data 508 may include information of values of flight parameters that are sought to be minimized or maximized. Flight parameter threshold data 508 may include, but is not limited to, temperature thresholds, such as temperatures of batteries, inverters, rotors, motors, and the like. Flight parameter threshold data 508 may include, but is not limited to, altitude thresholds, speed thresholds, torque thresholds, flight mode duration thresholds, and the like. Flight parameter threshold data 508 may be received from user input, external computing devices, and/or previous flights of an electric aircraft. As a non-limiting, an electric aircraft may initially have a torque threshold of 450 N*m. An electric aircraft may be shown to sustain torques of up to 500 N*m without damage to the rotor and/or motor. Continuing this example, flight parameter threshold data 508 may be updated to include the new torque threshold of 500 N*m. Flight parameter threshold data 508 may be determined by a machine learning model.

Still referring to FIG. 5, indicator database 500 may include historical performance data 512. Historical performance data 512 may include information of flight performance of one or more electric aircraft. Historical performance data 512 may include flight ranges of completed flights. As a non-limiting example, historical performance data 512 may show data of an electric aircraft completing a trip of 250 miles on a single charge. Historical performance data 512 may include performance data of one or more parts of an electric aircraft such as, but not limited to, battery packs, battery cells, rotors, motors, inverters, propulsors, and the like. Historical performance data 512 may be used by a machine learning model to predict flight ranges of electric aircraft and/or most limiting parameters.

Figure 6:
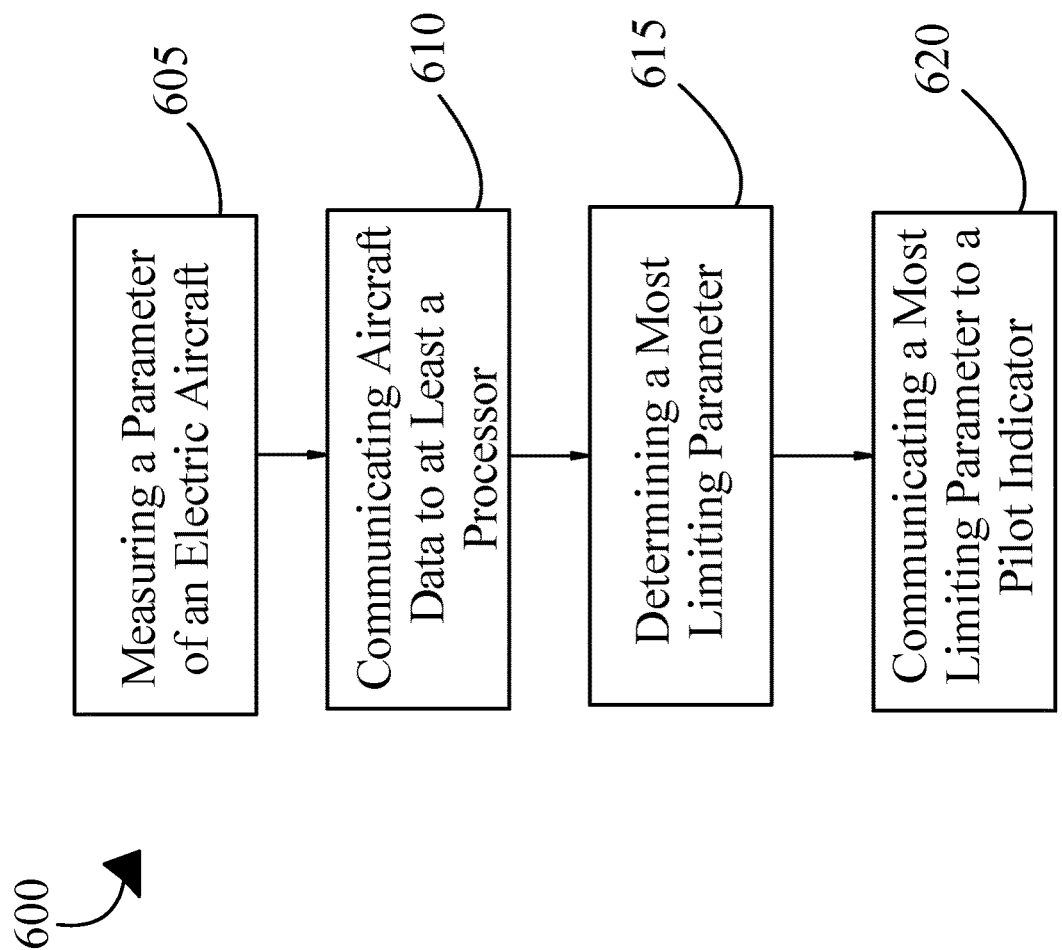
FIG. 6 is a flowchart of a method of determining a most limiting parameter.

Referring now to FIG. 6, method 600 of determining a most limiting parameter of an electric aircraft is presented. At step 605, method 600 includes measuring a parameter of an electric aircraft. A parameter of an electric aircraft may be measured through a sensing device. In some embodiments, a measurement of a parameter of an electric aircraft may include, but is not limited to, a measurement of temperature, altitude, speed, torque output, and the like. A sensing device may measure a parameter of an electric aircraft and generate aircraft data from the parameter of the electric aircraft. This step may be implemented without limitation as described above in FIGS. 1-5.

Still referring to FIG. 6, at step 610, method 600 includes communicating aircraft data to at least a processor. Communicating aircraft data may include wireless or wired communication between at least a processor and a sensing device. This step may be implemented without limitation as described above in FIGS. 1-5.

Still referring to FIG. 6, at step 615, method 600 includes determining a most limiting parameter. A most limiting parameter may be determined by at least a processor. In some embodiments, a most limiting parameter may include a flight parameter that may negatively impact a flight range of an electric aircraft. As a non-limiting example, a most limiting parameter may include, but is not limited to, rotor temperature, motor temperature, inverter temperature, torque output, altitude, heating systems, lighting systems, and the like. In some embodiments, a most limiting parameter may be related to at least a battery of an electric aircraft. A most limiting parameter may include, but is not limited to, battery pack temperature, battery pack charge, battery pack health, and the like. In some embodiments, determining a most limiting parameter may include comparing aircraft data to a flight confidence parameter. In some embodiments, at least a processor may compare aircraft data to a flight confidence parameter. A comparison may include at least a processor generating an objective function. At least a processor may be configured to compare aircraft data to an optimization criterion. In some embodiments, at least a processor may be configured to compare aircraft data to a flight parameter threshold. This step may be implemented without limitation as described above in FIGS. 1-5.

Still referring to FIG. 6, at step 620, method 600 includes communicating a most limiting parameter to a pilot indicator. A pilot indicator may include a visual and/or audio communication device such as, but not limited to, screens, speakers, lights, and the like. At least a processor may communicate a most limiting parameter to a pilot indicator which may show a list of most limiting parameters, historical trends, and/or other aircraft data. In some embodiments, an operational threshold of one or more parts of an electric aircraft may be reached. At least a processor may alert a pilot through a pilot indicator of one or more parts exceeding operational threshold limits of an electric aircraft. This step may be implemented without limitation as described above in FIGS. 1-5.

Referring now to FIG. 7, another exemplary embodiment of electric aircraft 700 is depicted. Electric aircraft 700 may include a laterally extending element 704. Electric aircraft 700 includes a set of propulsors. Each propulsor of the set of propulsors may be electrically connected to a battery pack 140 and a generator 708, the set of propulsors Electric aircraft 700 may include at least a lift component, such as at least a lift propulsor 712, and a pusher component, such as a pusher propulsor 716. Each of the at least a lift propulsor 712 shown in FIG. 7 may be connected to a second propulsor boom 720. It should be noted, for the sake of clarity, that electric aircraft 700 also may include another pair of lift propulsor 712 attached to a first propulsor boom 128, however, those elements are hidden in FIG. 7.

With continued reference to FIG. 7, fuselage 204 may include battery pack 140. In some embodiments, electrical energy source may be located in a battery bay 724. For the purposes of this disclosure, a "battery bay" is a compartment configured to hold batteries in an aircraft. In some embodiments, battery bay 724 may be located in the belly of electric aircraft 700. For the purposes of this disclosure, the "belly" of electric aircraft 700 is the lower portion of fuselage 204 (i.e. the portion of fuselage 204 that is closest to the landing gear in FIG. 7). Battery pack 140 may be consistent with any electrical energy source disclosed as part of this disclosure. Battery pack 140 includes a plurality of batteries. In some embodiments, battery pack 140 may include a plurality of electrical energy source modules, wherein each of the electrical energy source modules include a plurality of batteries connected in series. Battery pack 140 may be used to provide a steady supply of electrical power to a load over the course of a flight by electric aircraft 700. For example, the battery pack 140 may be capable of providing sufficient power for "cruising" and other relatively low-energy phases of flight. Battery pack 140 may also be capable of providing electrical power for some higher-power phases of flight as well, particularly when the battery pack 140 is at a high SOC, as may be the case for instance during takeoff. In some embodiments, battery pack 140 may be capable of supplying power during vertical take off and landing. In some embodiments, battery pack 140 may not provide power when electric aircraft 700 is fixed-wing flight. In an embodiment, the battery pack 140 may be capable of providing sufficient electrical power for auxiliary loads including without limitation, lighting, navigation, communications, de-icing, steering or other systems requiring power or energy. As used herein the battery pack 140 may have high power density where the electrical power a battery pack 140 can usefully produce per unit of volume and/or mass is relatively high. The electrical power is defined as the rate of electrical energy per unit time. Battery pack 140 may include a device for which power that may be produced per unit of volume and/or mass has been optimized, at the expense of the maximal total specific energy density or power capacity, during design. Non-limiting examples of items that may be used as at least an battery pack 140 may include batteries used for starting applications including Li ion batteries which may include NCA, NMC, Lithium iron phosphate (LiFePO4) and Lithium Manganese Oxide (LMO) batteries, which may be mixed with another cathode chemistry to provide more specific power if the application requires Li metal batteries, which have a lithium metal anode that provides high power on demand, Li ion batteries that have a silicon or titanite anode, battery pack 140 may be used, in an embodiment, to provide electrical power to an electric aircraft or drone, such as an electric aircraft vehicle, during moments requiring high rates of power output, including without limitation takeoff, landing, thermal de-icing and situations requiring greater power output for reasons of stability, such as high turbulence situations, as described in further detail below. A battery may include, without limitation a battery using nickel based chemistries such as nickel cadmium or nickel metal hydride, a battery using lithium ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), a battery using lithium polymer technology, lead-based batteries such as without limitation lead acid batteries, metal-air batteries, or any other suitable battery. Persons skilled in the art, upon reviewing the entirety of this disclosure, will be aware of various devices of components that may be used as an battery pack 140.

Still referring to FIG. 7, connecting batteries in series may increase the voltage of at least battery pack 140 which may provide more power on demand. Connecting batteries in parallel may increase total current capacity by decreasing total resistance, and it also may increase overall amp-hour capacity. The overall energy and power outputs of at least battery pack 140 may be based on the individual battery cell performance or an extrapolation based on the measurement of at least an electrical parameter. Persons skilled in the art will be aware, after reviewing the entirety of this disclosure, of many different components of battery pack 140. Exemplary battery packs 140 are disclosed in detail in U.S. patent application Ser. Nos. 16/948,157 and 16/948,140 both entitled "SYSTEM AND METHOD FOR HIGH ENERGY DENSITY BATTERY MODULE" by S. Donovan et al., which are incorporated in their entirety herein by reference.

Still referring to FIG. 7, fuselage 204 includes a generator 708. In some embodiments, generator 708 may be located in battery bay 724. A "generator," for the purposes of this disclosure, is a machine configured to generate electrical power from motive power. As a non-limiting example, in some embodiments, generator 708 may include a turbine generator. As a non-limiting example, in some embodiments, generator 708 may include a reciprocating engine. As a non-limiting example, in some embodiments, generator 708 may include a fuel cell engine. As a non-limiting example, in some embodiments, generator 708 may include a fuel reformer. In some embodiments, the generator 708 may have a power rating of over 200 kW. In some embodiments, the generator 708 may have a power rating of greater than 300 kW. In some embodiments, generator 708 may include a Rolls-Royce M250. A person of ordinary skill in the art would recognize, after having reviewed the entirety of this disclosure, that generator 708 may have a wide range of power ratings, depending on the power demands required by the specific application. Generator 708 is configured to produce enough electrical power to sustain the fixed-wing flight of electric aircraft 700. For the purposes of this disclosure, fixed-wing flight is "sustained" when electric aircraft 700 is able to maintain a consistent altitude when in fixed-wing flight. Generator 708 is not configured to produce enough electrical power to sustain vertical take-off and landing. Generator 708 generates electrical power using fuel from a fuel tank 728. Generator 708 is in fluid communication with fuel tank 728. For the purposes of this disclosure being in "fluid communication" means that fluid is able to flow from one of the fluidly connected elements to the other, notwithstanding any elements that temporarily or optionally restrict fluid flow, such as, as non-limiting examples, a check valve or a pressure disk. In some embodiments, fuselage 204 may include one or more inlet. inlet may provide an opening into the interior of fuselage 204 through which air may flow. In some embodiments, inlet may be designed to provide airflow to generator 708. As a non-limiting example this airflow may be used to cool generator 708. inlet may have a variety of profile shapes. As a non-limiting example, the profile shape inlet may be rectangular. In some embodiments, the profile shape of inlet may be tear drop shaped. For the purposes of this disclosure, the "profile shape" of inlet is the shape of the opening formed by inlet in fuselage 204 as projected onto a 2D surface. In some embodiments, inlet may be a low drag air inlet. As a non-limiting example, inlet may include a NACA duct. In some embodiments, fuselage 204 may include an outlet. Outlet may allow air to pass out of fuselage 204. Outlet may be in fluid connection with an exhaust of generator 708. In some embodiments, outlet may have a circular profile shape. In some embodiments, outlet may have a rectangular profile shape. In some embodiments, outlet may have an irregular shape. For the purposes of this disclosure, the "profile shape" of outlet is the shape of the opening formed by outlet in fuselage 204 as projected onto a 2D surface.

Still referring to FIG. 7, fuselage 204 includes fuel tank 728. In some embodiments, fuel tank 728 may be located in battery bay 724. For the purposes of this disclosure, a "fuel tank" is a container designed to hold fuel. Fuel tank 728 contains fuel. As a non-limiting example, fuel tank 728 may contain aviation fuel. As a non-limiting example, aviation fuel may include jet fuel such as Jet A-1 and Jet B. As a non-limiting example, aviation fuel may include unleaded kerosene or naphtha-kerosene. As a non-limiting example, aviation fuel may include gasoline suitable for the aviation context. In some embodiments, fuel tank 728 may contain gasoline. In some embodiments, fuel tank 728 may include diesel. In some embodiments, fuel tank 728 may contain hydrogen gas. A person of ordinary skill in the art, after having reviewed the entirety of this disclosure, would understand that the fuel contained in fuel tank 728 must be compatible with generator 708 in order to ensure operability. Fuel tank 728 is in fluid communication with generator 708. In some embodiments, fuel tank 728 may include a fuel line. The fuel line may be in fluid communication with generator 708. The fuel line may be a hose, tube, conduit, and the like. In some embodiments, fuel tank 728 may include a fuel pump. The fuel pump may be configured to pump fuel from fuel tank 728 to generator 708. In some embodiments, fuel tank 728 may include a fuel valve. A "valve," for the purposes of this disclosure, is a device for restricting or otherwise controlling the flow of a liquid, gas, or fluid. In some embodiments, fuel valve may control the flow of fuel between fuel tank 728 and generator 708. In some embodiments, fuel valve may include a gate valve. In some embodiments, fuel valve may include a solenoid-operated valve. In some embodiments, fuel valve may include a spray valve.

Still referring to FIG. 7, electric aircraft 700 may include at least a power unit pod. For the purposes of this disclosure, a "power unit pod" is an enclosed body, separate from the fuselage of the aircraft, containing an auxiliary power unit. Power unit pod may include an auxiliary power unit (APU). An "auxiliary power unit," for the purposes of this disclosure, is an aircraft engine that does not produce thrust. APU may be configured to generate electric power. APU may be said to be configured to generate electric power, if the APU drives an electric generator. In some embodiments, APU may include an electric generator. As a non-limiting example, in some embodiments, APU may include a turbine engine. As a non-limiting example, in some embodiments, APU may include a reciprocating engine. As a non-limiting example, in some embodiments, APU may include a fuel cell engine. Power unit pod may include a fuel tank. Power unit pod may be contained within a nacelle. A "nacelle" for the purposes of this disclosure, is an aerodynamically streamlined body, that is streamlined according to what it contains. Power unit pod may include an electrical connection, such as a high voltage power line, that electrically connects generator in the power unit pod to propulsor, such as lift propulsor 712 and/or pusher propulsor 716. Power unit pod may be consistent with disclosure of power unit pod in U.S. patent application Ser. No. 17/734,014, filed Apr. 30, 2022, and titled "HYBRID PROPULSION SYSTEMS FOR AN ELECTRIC AIRCRAFT."

With continued reference to FIG. 7, in some embodiments, electric aircraft 700 may include a flight controller 224. Flight controller 224 may be communicatively connected to the generator 708. In some embodiments, flight controller 224 may be communicatively connected to each of the at least a propulsor. Flight controller 224 may be consistent with any flight controller disclosed as part of this disclosure. Flight controller 224 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. flight controller 224 may include a single computing device operating independently, or may include two or more computing device operating in concert, in parallel, sequentially or the like; two or more computing devices may be included together in a single computing device or in two or more computing devices. flight controller 224 may interface or communicate with one or more additional devices as described below in further detail via a network interface device. Network interface device may be utilized for connecting flight controller 224 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. flight controller 224 may include but is not limited to, for example, a computing device or cluster of computing devices in a first location and a second computing device or cluster of computing devices in a second location. flight controller 224 may include one or more computing devices dedicated to data storage, security, distribution of traffic for load balancing, and the like. flight controller 224 may distribute one or more computing tasks as described below across a plurality of computing devices of computing device, which may operate in parallel, in series, redundantly, or in any other manner used for distribution of tasks or memory between computing devices. flight controller 224 may be implemented using a "shared nothing" architecture in which data is cached at the worker, in an embodiment, this may enable scalability of system 100 and/or computing device.

With continued reference to FIG. 7, flight controller 224 may be designed and/or configured to perform any method, method step, or sequence of method steps in any embodiment described in this disclosure, in any order and with any degree of repetition. For instance, flight controller 224 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. flight controller 224 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 8:
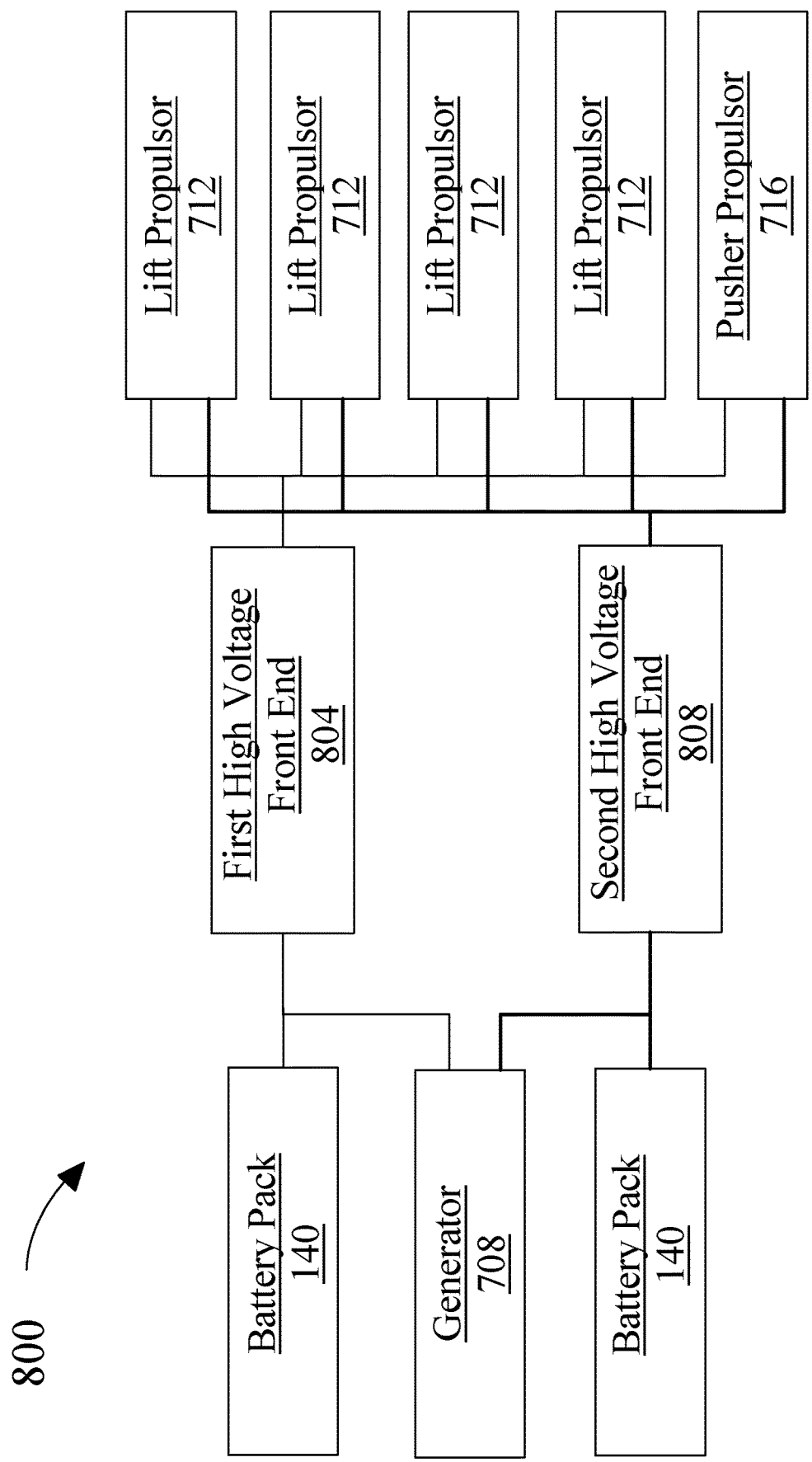
FIG. 8 is a block diagram of an exemplary power distribution system.

Referring now to FIG. 8, a power distribution system 800 is illustrated. Power distribution system 800 may be located on the electric aircraft, such as electric aircraft 700. In some embodiments, system 800 may include a first high voltage front end 804. For the purposes of this disclosure, a "high voltage front end" is an interface between one or more sources of energy and one or more loads, wherein the interface is configured to handle high voltage power. First high voltage front end 804 may be consistent with any high voltage front end device disclosed in U.S. patent application Ser. No. 17/108,798, filed on Dec. 1, 2020, and titled "SYSTEMS AND METHODS FOR A BATTERY MANAGEMENT SYSTEM INTEGRATED IN A BATTERY PACK CONFIGURED FOR USE IN ELECTRIC AIRCRAFT," the entirety of which is hereby incorporated by reference. First high voltage front end 804 may be electrically connected to battery pack 140. In some embodiments, first high voltage front end 804 may be electrically connected to each of the at least a propulsor. In some embodiments, first high voltage front end 804 may provide power to each of the at least a propulsor. In some embodiments, first high voltage front end 804 may be electrically connected to generator 708. First high voltage front end 804 may receive power from the battery packs 140 and generator 708 and send power to the lift propulsors 712 and pusher propulsor 716.

As depicted in FIG. 8, first high voltage front end 804 may be electrically connected to only a subset of battery packs 140 and generator 708. As depicted in FIG. 8, first high voltage front end 804 may be electrically connected to one of two battery pack 140. First high voltage front end 804 may be electrically connected to generator 708. First high voltage front end 804 can distribute the power from these components to lift propulsors 712 and pusher propulsor 716.

With continued reference to FIG. 8, in some embodiments, system 800 may include a second high voltage front end 808. Second high voltage front end 808 may be consistent with any high voltage front end device disclosed in U.S. patent application Ser. No. 17/108,798, filed on Dec. 1, 2020, and titled "SYSTEMS AND METHODS FOR A BATTERY MANAGEMENT SYSTEM INTEGRATED IN A BATTERY PACK CONFIGURED FOR USE IN ELECTRIC AIRCRAFT." Second high voltage front end 808 may be electrically connected to battery pack 140. In some embodiments, second high voltage front end 808 may be electrically connected to each of the at least a propulsor. In some embodiments, second high voltage front end 808 may provide power to each of the at least a propulsor. In some embodiments, second high voltage front end 808 may be electrically connected to generator 708. Second high voltage front end 808 may receive power from the battery packs 140 and generator 708 and send power to the lift propulsors 712 and pusher propulsor 716.

As depicted in FIG. 8, second high voltage front end 808 may be electrically connected to only a subset of battery packs 140 and generator 708. As depicted in FIG. 8, second high voltage front end 808 may be electrically connected to one of two battery packs 140 and not electrically connected to generator 708. Second high voltage front end 808 can distribute the power from these components to lift propulsors 712 and pusher propulsor 716.

With continued reference to FIG. 8, in some embodiments, first high voltage front end 804 and/or second high voltage front end 808 may be communicatively connected to a controller, such as flight controller 224 or battery management controller. As a non-limiting example, first high voltage front end 804 and/or second high voltage front end 808 may be communicatively connected to a controller using a Controller Area Network (CAN) bus. A "CAN bus," for the purposes of this disclosure is a specialized internal communications network for a vehicle, configured to allow a controller to communicate with other components in the vehicle without the need for a host computer.

Figure 9:
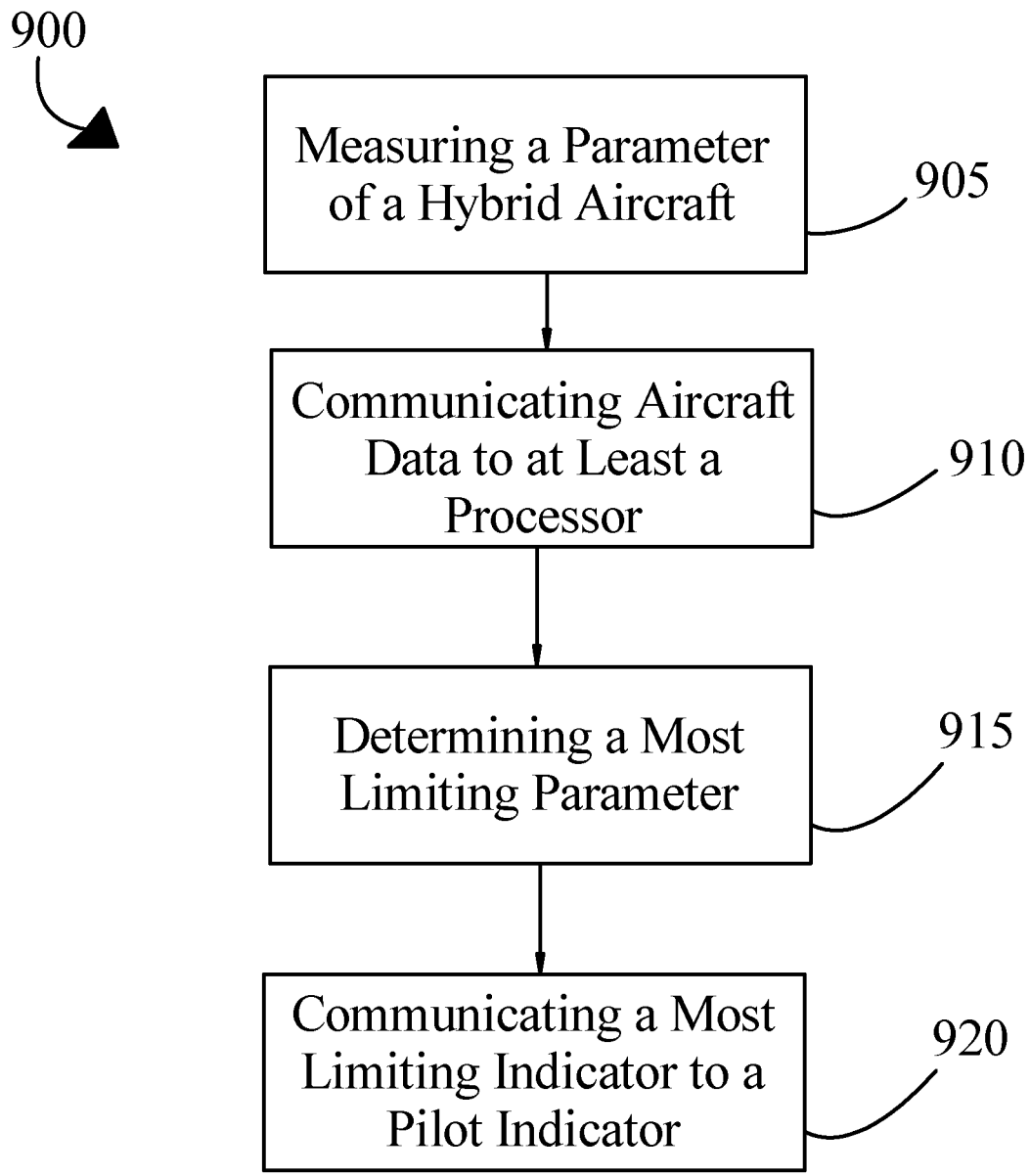
FIG. 9 is a flowchart of a method of determining a most limiting parameter.

Now referring to FIG. 9, method 900 of determining a most limiting parameter of hybrid aircraft is presented. At step 905, method 900 includes measuring a parameter of hybrid aircraft. A parameter of hybrid aircraft may be measured through a sensing device. In some embodiments, a measurement of a parameter of hybrid aircraft may include, but is not limited to, a measurement of temperature, altitude, speed, torque output, and the like. A sensing device may measure a parameter of hybrid aircraft and generate aircraft data from the parameter of the hybrid aircraft. This step may be implemented without limitation as described above in FIGS. 1-9.

Still referring to FIG. 9, at step 910, method 900 includes communicating aircraft data to at least a processor. Communicating aircraft data may include wireless or wired communication between at least a processor and a sensing device. This step may be implemented without limitation as described above in FIGS. 1-9.

Still referring to FIG. 9, at step 915, method 900 includes determining a most limiting parameter. A most limiting parameter may be determined by at least a processor. In some embodiments, a most limiting parameter may include a flight parameter that may negatively impact a flight range of hybrid aircraft. As a non-limiting example, a most limiting parameter may include, but is not limited to, rotor temperature, motor temperature, inverter temperature, torque output, altitude, heating systems, lighting systems, and the like. In some embodiments, a most limiting parameter may be related to at least a battery of hybrid aircraft. A most limiting parameter may include, but is not limited to, a fuel level, generator temperature, generator health, battery pack temperature, battery pack charge, battery pack health, and the like. A most limiting parameter may include remaining energy, which may be a combination of fuel level for generator and state of charge for battery pack. Most limiting parameter may be time of flight remaining and/or range of flight remaining, which may be based on remaining energy. In some embodiments, determining a most limiting parameter may include comparing aircraft data to a flight confidence parameter. In some embodiments, at least a processor may compare aircraft data to a flight confidence parameter. A comparison may include at least a processor generating an objective function. At least a processor may be configured to compare aircraft data to an optimization criterion. In some embodiments, at least a processor may be configured to compare aircraft data to a flight parameter threshold. This step may be implemented without limitation as described above in FIGS. 1-9.

Still referring to FIG. 9, at step 920, method 900 includes communicating a most limiting parameter to a pilot indicator. A pilot indicator may include a visual and/or audio communication device such as, but not limited to, screens, speakers, lights, and the like. At least a processor may communicate a most limiting parameter to a pilot indicator which may show a list of most limiting parameters, historical trends, and/or other aircraft data. In some embodiments, an operational threshold of one or more parts of hybrid aircraft may be reached. At least a processor may alert a pilot through a pilot indicator of one or more parts exceeding operational threshold limits of an hybrid aircraft. This step may be implemented without limitation as described above in FIGS. 1-9.

Figure 10:
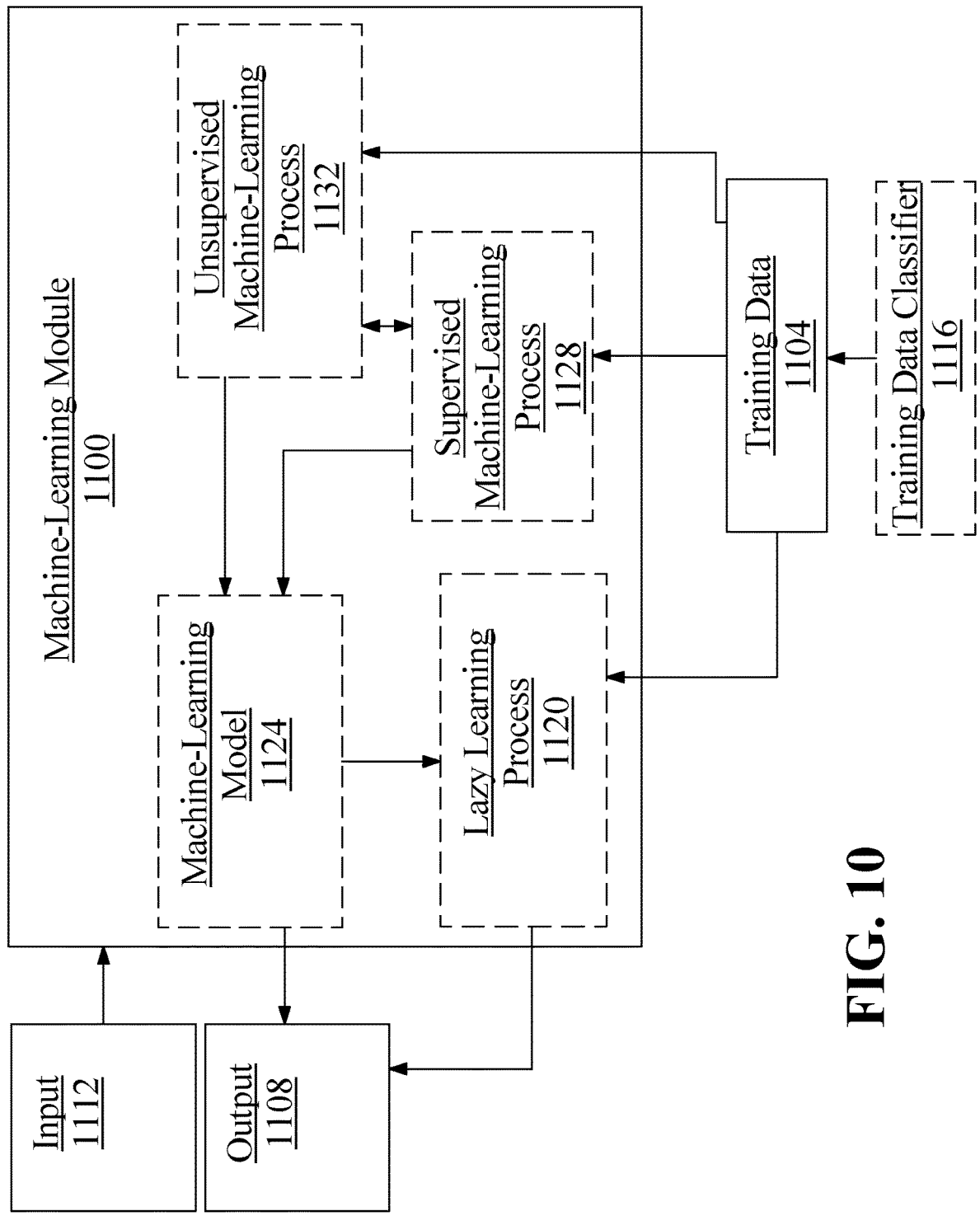
FIG. 10 is a block diagram of a machine learning model.

Referring now to FIG. 10, an exemplary embodiment of a machine-learning module 1000 that may perform one or more machine-learning processes as described in this disclosure is illustrated. Machine-learning module may perform determinations, classification, and/or analysis steps, methods, processes, or the like as described in this disclosure using machine learning processes. A "machine learning process", as used in this disclosure, is a process that automatedly uses training data 1004 to generate an algorithm that will be performed by a computing device/module to produce outputs 1008 given data provided as inputs 1012; this is in contrast to a non-machine learning software program where the commands to be executed are determined in advance by a user and written in a programming language.

Still referring to FIG. 10, "training data," as used herein, is data containing correlations that a machine-learning process may use to model relationships between two or more categories of data elements. For instance, and without limitation, training data 1004 may include a plurality of data entries, each entry representing a set of data elements that were recorded, received, and/or generated together; data elements may be correlated by shared existence in a given data entry, by proximity in a given data entry, or the like. Multiple data entries in training data 1004 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 1004 according to various correlations; correlations may indicate causative and/or predictive links between categories of data elements, which may be modeled as relationships such as mathematical relationships by machine-learning processes as described in further detail below. Training data 1004 may be formatted and/or organized by categories of data elements, for instance by associating data elements with one or more descriptors corresponding to categories of data elements. As a non-limiting example, training data 1004 may include data entered in standardized forms by persons or processes, such that entry of a given data element in a given field in a form may be mapped to one or more descriptors of categories. Elements in training data 1004 may be linked to descriptors of categories by tags, tokens, or other data elements; for instance, and without limitation, training data 1004 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 10, training data 1004 may include one or more elements that are not categorized; that is, training data 1004 may not be formatted or contain descriptors for some elements of data. Machine-learning algorithms and/or other processes may sort training data 1004 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 1004 to be made applicable for two or more distinct machine-learning algorithms as described in further detail below. Training data 1004 used by machine-learning module 1000 may correlate any input data as described in this disclosure to any output data as described in this disclosure. As a non-limiting illustrative example inputs may include aircraft data and outputs may include most limiting parameters.

Further referring to FIG. 10, training data may be filtered, sorted, and/or selected using one or more supervised and/or unsupervised machine-learning processes and/or models as described in further detail below; such models may include without limitation a training data classifier 1016. Training data classifier 1016 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 1000 may generate a classifier using a classification algorithm, defined as a processes whereby a computing device and/or any module and/or component operating thereon derives a classifier from training data 1004. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 1016 may classify elements of training data to flight parameters, such as battery pack temperatures, torque outputs, battery state of charge, battery state of health, and the like.

Still referring to FIG. 10, machine-learning module 1000 may be configured to perform a lazy-learning process 1020 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 1004. Heuristic may include selecting some number of highest-ranking associations and/or training data 1004 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 10, machine-learning processes as described in this disclosure may be used to generate machine-learning models 1024. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 1024 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 1024 may be generated by creating an artificial neural network, such as a convolutional neural network comprising an input layer of nodes, one or more intermediate layers, and an output layer of nodes. Connections between nodes may be created via the process of "training" the network, in which elements from a training data 1004 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 10, machine-learning algorithms may include at least a supervised machine-learning process 1028. At least a supervised machine-learning process 1028, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include aircraft data as described above as inputs, most limiting parameters as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 1004. Persons skilled in the art, upon reviewing the entirety of this disclosure, will be aware of various possible variations of at least a supervised machine-learning process 1028 that may be used to determine relation between inputs and outputs. Supervised machine-learning processes may include classification algorithms as defined above.

Further referring to FIG. 10, machine learning processes may include at least an unsupervised machine-learning processes 1032. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 10, machine-learning module 1000 may be designed and configured to create a machine-learning model 1024 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 10, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 11:
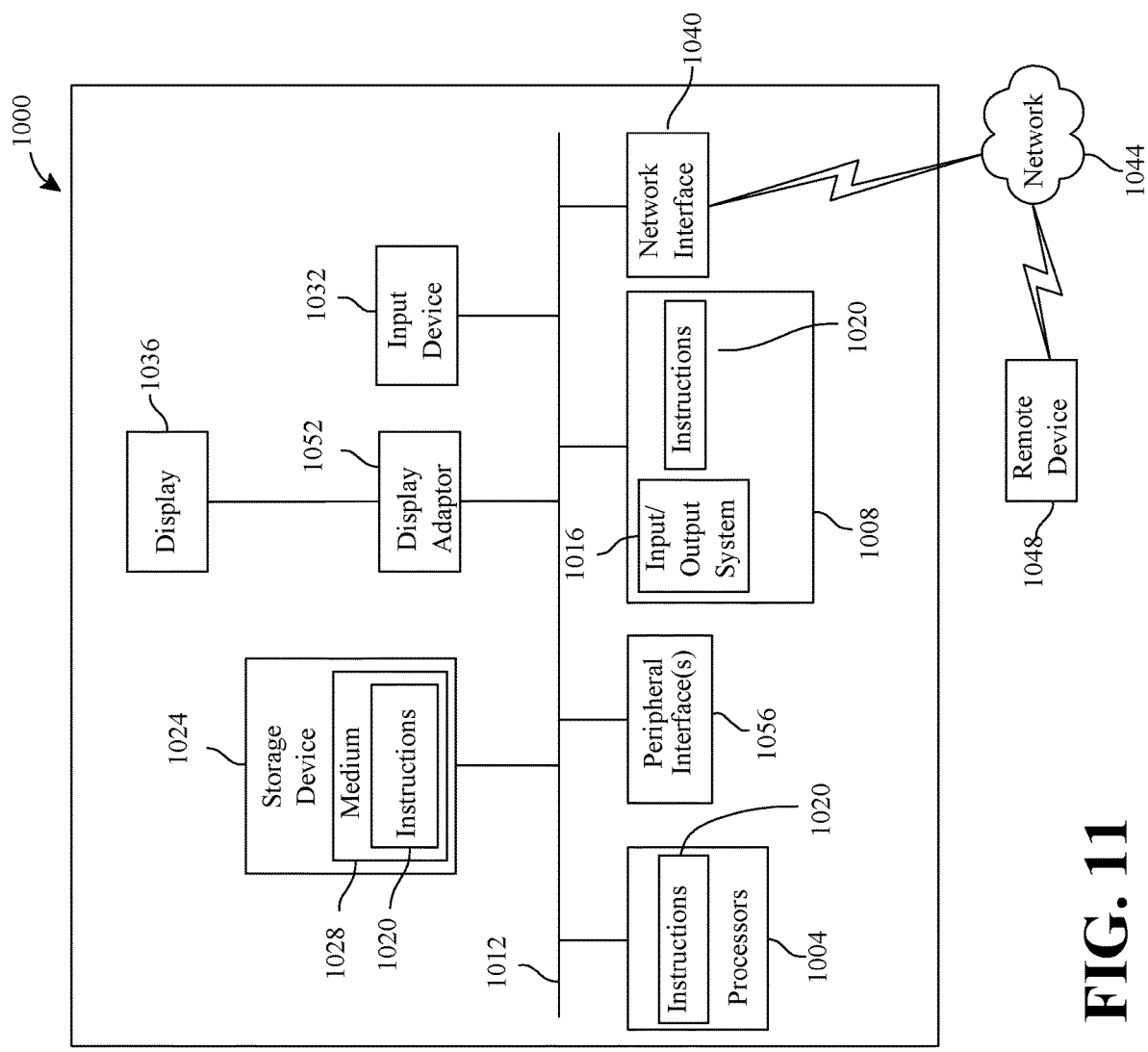
FIG. 11 is a block diagram of a computing system that can be used to implement any one or more of the methodologies disclosed herein and any one or more portions thereof.

FIG. 11 shows a diagrammatic representation of one embodiment of a computing device in the exemplary form of a computer system 1100 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1100 includes a processor 1104 and a memory 1108 that communicate with each other, and with other components, via a bus 1112. Bus 1112 may include any of several types of bus structures including, but not limited to, a memory bus, a memory controller, a peripheral bus, a local bus, and any combinations thereof, using any of a variety of bus architectures.

Still referring to FIG. 11, processor 1104 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1104 may be organized according to Von Neumann and/or Harvard architecture as a non-limiting example. Processor 1104 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Still referring to FIG. 11, memory 1108 may include various components (e.g., machine-readable media) including, but not limited to, a random-access memory component, a read only component, and any combinations thereof. In one example, a basic input/output system 1116 (BIOS), including basic routines that help to transfer information between elements within computer system 1100, such as during start-up, may be stored in memory 1108. Memory 1108 may also include (e.g., stored on one or more machine-readable media) instructions (e.g., software) 1120 embodying any one or more of the aspects and/or methodologies of the present disclosure. In another example, memory 1108 may further include any number of program modules including, but not limited to, an operating system, one or more application programs, other program modules, program data, and any combinations thereof.

Still referring to FIG. 11, computer system 1100 may also include a storage device 1124. Examples of a storage device (e.g., storage device 1124) include, but are not limited to, a hard disk drive, a magnetic disk drive, an optical disc drive in combination with an optical medium, a solid-state memory device, and any combinations thereof. Storage device 1124 may be connected to bus 1112 by an appropriate interface (not shown). Example interfaces include, but are not limited to, SCSI, advanced technology attachment (ATA), serial ATA, universal serial bus (USB), IEEE 1394

(FIREWIRE), and any combinations thereof. In one example, storage device 1124 (or one or more components thereof) may be removably interfaced with computer system 1100 (e.g., via an external port connector (not shown)). Particularly, storage device 1124 and an associated machine-readable medium 1128 may provide nonvolatile and/or volatile storage of machine-readable instructions, data structures, program modules, and/or other data for computer system 1100. In one example, software 1120 may reside, completely or partially, within machine-readable medium 1128. In another example, software 1120 may reside, completely or partially, within processor 1104.

Still referring to FIG. 11, computer system 1100 may also include an input device 1132. In one example, a user of computer system 1100 may enter commands and/or other information into computer system 1100 via input device 1132. Examples of an input device 1132 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1132 may be interfaced to bus 1112 via any of a variety of interfaces (not shown) including, but not limited to, a serial interface, a parallel interface, a game port, a USB interface, a FIREWIRE interface, a direct interface to bus 1112, and any combinations thereof. Input device 1132 may include a touch screen interface that may be a part of or separate from display 1136, discussed further below. Input device 1132 may be utilized as a user selection device for selecting one or more graphical representations in a graphical interface as described above.

Still referring to FIG. 11, a user may also input commands and/or other information to computer system 1100 via storage device 1124 (e.g., a removable disk drive, a flash drive, etc.) and/or network interface device 1140. A network interface device, such as network interface device 1140, may be utilized for connecting computer system 1100 to one or more of a variety of networks, such as network 1144, and one or more remote devices 1148 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1144, may employ a wired and/or a wireless mode of communication. In general, any network topology may be used. Information (e.g., data, software 1120, etc.) may be communicated to and/or from computer system 1100 via network interface device 1140.

Still referring to FIG. 11, computer system 1100 may further include a video display adapter 1152 for communicating a displayable image to a display device, such as display device 1136. Examples of a display device include, but are not limited to, a liquid crystal display (LCD), a cathode ray tube (CRT), a plasma display, a light emitting diode (LED) display, and any combinations thereof. Display adapter 1152 and display device 1136 may be utilized in combination with processor 1104 to provide graphical representations of aspects of the present disclosure. In addition to a display device, computer system 1100 may include one or more other peripheral output devices including, but not limited to, an audio speaker, a printer, and any combinations thereof. Such peripheral output devices may be connected to bus 1112 via a peripheral interface 1156. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, apparatuses, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus of an electric aircraft configured to determine a most limiting parameter in the electric aircraft, comprising:
   a processor; and
   a memory communicatively connected to the processor, the memory containing instructions that, when executed, cause the processor to:
      receive aircraft data from a sensing device of the electric aircraft, wherein the sensing device is configured to measure a parameter of at least one component or system of the electric aircraft and generate the aircraft data;
      determine, based at least in part on the aircraft data and based on one or more flight parameters, the most limiting parameter of the electric aircraft, wherein the most limiting parameter is related to a component of the electric aircraft having a greatest impact on a flight range of the electric aircraft;
      generate, based at least in part on the most limiting parameter, an alert comprising the most limiting parameter and an action; and
      cause the alert to be displayed via a pilot indicator to a user of the electric aircraft.

2. The apparatus of claim 1, wherein the instructions further configure the processor to:
   compare the aircraft data to at least a flight confidence parameter; and
   determine the most limiting parameter of the electric aircraft from a list of potential limiting parameters.

3. The apparatus of claim 1, wherein the one or more flight parameters include one or more of a fuel level, a generator temperature, a generator health, a battery pack temperature, a battery pack charge, a battery pack health, a rotor temperature, a motor temperature, an inverter temperature, torque output, altitude, heating systems, lighting systems, time of flight remaining, or range of flight remaining.

4. The apparatus of claim 1, wherein the processor is further configured to:
   receive training data correlating the aircraft data to the most limiting parameter;
   train a most limiting parameter machine learning model with the training data, wherein the most limiting parameter machine learning model is configured to receive additional aircraft data as input and output the most limiting parameter; and
   determine the most limiting parameter as a function of the most limiting parameter machine learning model.

5. The apparatus of claim 1, wherein the processor is further configured to:
   determine a flight mode of the electric aircraft; and
   determine the most limiting parameter of the electric aircraft as a function of the flight mode of the electric aircraft.

6. The apparatus of claim 1, wherein the action comprises one or more of:
   generating a power saving flight plan based on the most limiting parameter, the power saving flight plan including one or more of turning off lighting systems, turning of air conditioning systems, reducing speed, adjusting a flight mode, or reducing altitude; or
   determining a mitigating response based on the most limiting parameter, wherein the mitigating response includes one or more of reducing speeds, reducing torque, or switching the flight mode.

7. The apparatus of claim 6, wherein the processor is further configured to display the power saving flight plan or the mitigating response through the pilot indicator.

8. The apparatus of claim 1, wherein the electric aircraft comprises a hybrid aircraft.

9. The apparatus of claim 8, wherein the most limiting parameter corresponds to an amount of remaining energy, the amount being based on a combination of a fuel level for a generator and a state of charge for a battery pack.

10. The apparatus of claim 1, wherein the processor is further configured to automatically adjust at least a part of a flight system of the electric aircraft in response to determining the action.

11. A method for determining a most limiting parameter in an electric aircraft, comprising:
   receiving, by a processor of the electric aircraft, aircraft data from a sensing device of the electric aircraft, wherein the sensing device is configured to measure a parameter of at least one component or system of the electric aircraft and generate the aircraft data;
   determining, by the processor and based at least in part on the aircraft data and based on one or more flight parameters, the most limiting parameter of the electric aircraft, wherein the most limiting parameter is related to a component of the electric aircraft having a greatest impact on a flight range of the electric aircraft;
   generating, by the processor and based at least in part on the most limiting parameter, an alert comprising the most limiting parameter and an action; and
   causing, by the processor, the alert to be displayed via a pilot indicator to a user of the electric aircraft.

12. The method of claim 11, wherein the one or more flight parameters include one or more of a fuel level, a generator temperature, a generator health, a battery pack temperature, a battery pack charge, a battery pack health, a rotor temperature, a motor temperature, an inverter temperature, torque output, altitude, heating systems, lighting systems, time of flight remaining, or range of flight remaining.

13. The method of claim 11, wherein the processor is further configured to compare the aircraft data to a flight confidence parameter using an optimization criterion.

14. The method of claim 11, further comprising:
   receiving training data correlating the aircraft data to the most limiting parameter;
   training a most limiting parameter machine learning model with the training data, wherein the most limiting parameter machine learning model is configured to receive additional aircraft data as input and output the most limiting parameter; and
   determining the most limiting parameter as a function of the most limiting parameter machine learning model.

15. The method of claim 11, further comprising:
   determining a flight mode of the electric aircraft; and
   determining the most limiting parameter of the electric aircraft as a function of the flight mode of the electric aircraft.

16. The method of claim 11, wherein the action comprises one or more of:
   generating a power saving flight plan based on the most limiting parameter, the power saving flight plan including one or more of turning off lighting systems, turning of air conditioning systems, reducing speed, adjusting a flight mode, or reducing altitude; or
   determining a mitigating response based on the most limiting parameter, wherein the mitigating response includes one or more of reducing speeds, reducing torque, or switching the flight mode.

17. The method of claim 16, further comprising causing display of the power saving flight plan or the mitigating response through the pilot indicator.

18. The method of claim 11, wherein the electric aircraft comprises a hybrid aircraft.

19. The method of claim 18, wherein the most limiting parameter corresponds to an amount of remaining energy, the amount being based on a combination of a fuel level for a generator and a state of charge for a battery pack.

20. The method of claim 18, further comprising automatically adjusting at least a part of a flight system of the electric aircraft in response to determining the action.

* * * * *